(12) United States Patent
Huber et al.

(10) Patent No.: US 10,850,380 B2
(45) Date of Patent: Dec. 1, 2020

(54) MULTI-SPEED POWER TOOL WITH ELECTRONIC CLUTCH

(71) Applicant: Milwaukee Electric Tool Corporation, Brookfield, WI (US)

(72) Inventors: Alex Huber, Milwaukee, WI (US); Carl Benjamin Westerby, Milwaukee, WI (US); Daniel Robert Ertl, Brookfield, WI (US); Matthew Wycklendt, Madison, WI (US); Matthew Mergener, Mequon, WI (US); Mark Alan Kubale, West Bend, WI (US); Cole Conrad, Wauwatosa, WI (US); Wing Fung Yip, Kowloon (HK)

(73) Assignee: Milwaukee Electric Tool Corporation, Brookfield, WI (US)

( * ) Notice: Subject to any disclaimer, the term of this patent is extended or adjusted under 35 U.S.C. 154(b) by 971 days.

(21) Appl. No.: 15/146,547

(22) Filed: May 4, 2016

(65) Prior Publication Data
US 2016/0354888 A1      Dec. 8, 2016

Related U.S. Application Data

(60) Provisional application No. 62/180,586, filed on Jun. 16, 2015, provisional application No. 62/169,671, filed on Jun. 2, 2015.

(51) Int. Cl.
*B25F 5/00* (2006.01)
*B25D 16/00* (2006.01)
*F16D 48/06* (2006.01)

(52) U.S. Cl.
CPC ......... *B25D 16/006* (2013.01); *B25D 16/003* (2013.01); *B25F 5/001* (2013.01);
(Continued)

(58) Field of Classification Search
CPC ........ B25F 5/001; F16D 48/064; F16D 48/06; B25D 16/006; B25D 16/003; B23Q 17/00; B23Q 17/008; B23Q 17/10; B23Q 17/007
(Continued)

(56) References Cited

U.S. PATENT DOCUMENTS

| | | | |
|---|---|---|---|
| 3,671,837 A * | 6/1972 | Kanno | ...................... H02P 6/20 388/843 |
| 3,882,305 A | 5/1975 | Johnstone | |

(Continued)

FOREIGN PATENT DOCUMENTS

| | | |
|---|---|---|
| DE | 10029132 | 1/2002 |
| DE | 10309703 | 9/2004 |

(Continued)

OTHER PUBLICATIONS

International Search Report and Written Opinion for Application No. PCT/US2016/030769 dated Aug. 5, 2016 (11 pages).
(Continued)

*Primary Examiner* — Robert F Long
(74) *Attorney, Agent, or Firm* — Michael Best & Friedrich LLP

(57) ABSTRACT

A power tool and a method of operating a power tool including a motor, a clutch collar including a plurality of settings, a wireless transceiver operable to form a wireless connection with a remote device, and a processor coupled to the clutch collar and the wireless transceiver. The processor receives, via the wireless transceiver, a mapping including a plurality of torque levels corresponding to the plurality of settings. The processor detects that the clutch collar is set to a setting of the plurality of settings. The processor is further determines the torque level for the setting from the mapping and detects, during the operation of the power tool, that a
(Continued)

torque of the power tool exceeds the torque level. The processor is also configured to generate an indication that the torque exceeds the torque level. The indication may include flashing a light, ratcheting the motor, and stopping the motor.

27 Claims, 10 Drawing Sheets

(52) U.S. Cl.
CPC ........ *F16D 48/06* (2013.01); *B25D 2250/165* (2013.01); *B25D 2250/205* (2013.01); *B25D 2250/221* (2013.01); *F16D 2500/10418* (2013.01); *F16D 2500/3022* (2013.01); *F16D 2500/3027* (2013.01); *F16D 2500/30415* (2013.01); *F16D 2500/30426* (2013.01); *F16D 2500/51* (2013.01); *F16D 2500/7101* (2013.01); *F16D 2500/7102* (2013.01); *F16D 2500/7103* (2013.01); *F16D 2500/7104* (2013.01)

(58) Field of Classification Search
USPC ...................................................... 173/2, 176
See application file for complete search history.

(56) References Cited

U.S. PATENT DOCUMENTS

| | | | |
|---|---|---|---|
| 4,249,117 A | 2/1981 | Leukhardt et al. | |
| 4,487,270 A * | 12/1984 | Huber | B23B 45/02 173/176 |
| 4,545,106 A | 10/1985 | Juengel | |
| 4,625,160 A * | 11/1986 | Hucker | H02K 3/16 310/115 |
| 4,661,756 A * | 4/1987 | Murphy | H02P 25/08 310/168 |
| 4,680,862 A | 7/1987 | Wieland et al. | |
| 4,685,050 A | 8/1987 | Polzer et al. | |
| 4,854,786 A | 8/1989 | Alexander et al. | |
| 4,991,473 A | 2/1991 | Gotman | |
| 5,025,903 A | 6/1991 | Elligson | |
| 5,277,261 A | 1/1994 | Sakoh | |
| 5,315,501 A | 5/1994 | Whitehouse | |
| 5,592,396 A | 1/1997 | Tambini et al. | |
| 5,903,462 A | 5/1999 | Wagner et al. | |
| 5,942,975 A | 8/1999 | Sørensen | |
| 6,055,484 A | 4/2000 | Lysaght | |
| 6,123,241 A | 9/2000 | Walter et al. | |
| 6,157,313 A | 12/2000 | Emmermann | |
| 6,161,629 A | 12/2000 | Hohmann et al. | |
| 6,279,668 B1 | 8/2001 | Mercer | |
| 6,349,266 B1 | 2/2002 | Lysaght et al. | |
| 6,405,598 B1 | 6/2002 | Bareggi | |
| 6,424,799 B1 | 7/2002 | Gilmore | |
| 6,431,425 B1 | 8/2002 | Moorman et al. | |
| 6,469,615 B1 | 10/2002 | Kady et al. | |
| 6,508,313 B1 | 1/2003 | Carney et al. | |
| 6,520,270 B2 | 2/2003 | Wissmach et al. | |
| 6,522,949 B1 | 2/2003 | Ikeda et al. | |
| 6,547,014 B2 | 4/2003 | McCallops et al. | |
| 6,565,476 B1 * | 5/2003 | Bae | F16D 25/0638 192/20 |
| 6,598,684 B2 | 7/2003 | Watanabe | |
| 6,668,212 B2 | 12/2003 | Colangelo, II et al. | |
| 6,687,567 B2 | 2/2004 | Watanabe | |
| 6,784,801 B2 | 8/2004 | Watanabe et al. | |
| 6,836,614 B2 | 12/2004 | Gilmore | |
| 6,848,516 B2 | 2/2005 | Giardino | |
| 6,872,121 B2 | 3/2005 | Wiener et al. | |
| 6,913,087 B1 | 7/2005 | Brotto et al. | |
| 6,923,285 B1 | 8/2005 | Rossow et al. | |
| 6,938,689 B2 | 9/2005 | Farrant et al. | |
| 6,954,048 B2 | 10/2005 | Cho | |
| 6,968,908 B2 | 11/2005 | Tokunaga et al. | |
| 6,981,311 B2 | 1/2006 | Seith et al. | |
| 7,034,711 B2 | 4/2006 | Sakatani et al. | |
| 7,035,710 B2 | 4/2006 | Balling | |
| 7,035,898 B1 | 4/2006 | Baker | |
| 7,036,703 B2 | 5/2006 | Grazioli et al. | |
| 7,062,998 B2 | 6/2006 | Hohmann et al. | |
| 7,064,502 B2 | 6/2006 | Garcia et al. | |
| 7,086,483 B2 | 8/2006 | Arimura et al. | |
| 7,102,303 B2 | 9/2006 | Brotto et al. | |
| 7,112,934 B2 | 9/2006 | Gilmore | |
| 7,123,149 B2 | 10/2006 | Nowak et al. | |
| 7,137,541 B2 | 11/2006 | Baskar et al. | |
| 7,211,972 B2 | 5/2007 | Garcia et al. | |
| 7,218,227 B2 | 5/2007 | Davis et al. | |
| 7,243,440 B2 | 7/2007 | DeKeyser | |
| 7,328,086 B2 | 2/2008 | Perry et al. | |
| 7,328,757 B2 | 2/2008 | Davies | |
| 7,330,129 B2 | 2/2008 | Crowell et al. | |
| 7,343,764 B2 | 3/2008 | Solfronk | |
| 7,346,422 B2 | 3/2008 | Tsuchiya et al. | |
| 7,359,762 B2 | 4/2008 | Etter et al. | |
| 7,382,272 B2 | 6/2008 | Feight | |
| 7,437,204 B2 | 10/2008 | Lev-Ami et al. | |
| 7,464,769 B2 | 12/2008 | Nakazawa et al. | |
| 7,501,778 B2 | 3/2009 | Hashimoto et al. | |
| 7,540,334 B2 | 6/2009 | Gass et al. | |
| 7,613,590 B2 | 11/2009 | Brown | |
| 7,646,155 B2 | 1/2010 | Woods et al. | |
| RE41,185 E | 3/2010 | Gilmore et al. | |
| 7,690,569 B2 | 4/2010 | Swanson et al. | |
| 7,750,811 B2 | 7/2010 | Puzio et al. | |
| 7,784,104 B2 | 8/2010 | Innami et al. | |
| 7,787,981 B2 | 8/2010 | Austin et al. | |
| 7,795,829 B2 | 9/2010 | Seiler et al. | |
| 7,809,495 B2 | 10/2010 | Leufen | |
| 7,817,062 B1 | 10/2010 | Li et al. | |
| 7,834,566 B2 | 11/2010 | Woods et al. | |
| 7,868,591 B2 | 1/2011 | Phillips et al. | |
| 7,898,403 B2 | 3/2011 | Ritter et al. | |
| 7,900,524 B2 | 3/2011 | Calloway et al. | |
| 7,911,379 B2 | 3/2011 | Cameron | |
| 7,928,673 B2 | 4/2011 | Woods et al. | |
| 7,931,096 B2 | 4/2011 | Saha | |
| 7,942,084 B2 | 5/2011 | Wilson, Jr. et al. | |
| 7,942,211 B2 | 5/2011 | Scrimshaw et al. | |
| 7,953,965 B2 | 5/2011 | Qin et al. | |
| 7,982,624 B2 | 7/2011 | Richter et al. | |
| 8,004,397 B2 | 8/2011 | Forrest et al. | |
| 8,004,664 B2 | 8/2011 | Etter et al. | |
| 8,005,647 B2 | 8/2011 | Armstrong et al. | |
| 8,044,796 B1 | 10/2011 | Carr, Sr. | |
| 8,049,636 B2 | 11/2011 | Buckingham et al. | |
| 8,169,298 B2 | 5/2012 | Wiesner et al. | |
| 8,171,828 B2 | 5/2012 | Duvan et al. | |
| 8,210,275 B2 | 7/2012 | Suzuki et al. | |
| 8,251,158 B2 * | 8/2012 | Tomayko | B23B 45/008 173/11 |
| 8,255,358 B2 | 8/2012 | Ballew et al. | |
| 8,260,452 B2 | 9/2012 | Austin et al. | |
| 8,264,374 B2 | 9/2012 | Obatake et al. | |
| 8,281,871 B2 | 10/2012 | Cutler et al. | |
| 8,286,723 B2 | 10/2012 | Puzio et al. | |
| 8,294,424 B2 | 10/2012 | Bucur | |
| 8,310,206 B2 | 11/2012 | Bucur | |
| 8,316,958 B2 | 11/2012 | Schell et al. | |
| 8,330,426 B2 | 12/2012 | Suzuki et al. | |
| 8,351,982 B2 | 1/2013 | Rofougaran | |
| 8,406,697 B2 | 3/2013 | Arimura et al. | |
| 8,412,179 B2 | 4/2013 | Gerold et al. | |
| 8,438,955 B2 | 5/2013 | Wilson, Jr. et al. | |
| 8,464,808 B2 | 6/2013 | Leü | |
| 8,485,049 B2 | 7/2013 | Yokoyama et al. | |
| 8,611,250 B2 | 12/2013 | Chen et al. | |
| 8,645,176 B2 | 2/2014 | Walton et al. | |
| 8,657,482 B2 | 2/2014 | Malackowski et al. | |
| 8,666,936 B2 | 3/2014 | Wallace | |
| 8,674,640 B2 | 3/2014 | Suda et al. | |

(56) References Cited

U.S. PATENT DOCUMENTS

| | | |
|---|---|---|
| 8,678,106 B2 | 3/2014 | Matsunaga et al. |
| 8,823,322 B2 | 9/2014 | Noda et al. |
| 8,890,449 B2 | 11/2014 | Suzuki et al. |
| 8,919,456 B2 | 12/2014 | Ng et al. |
| 8,965,841 B2 | 2/2015 | Wallace |
| 9,030,145 B2 | 5/2015 | Brennenstuhl et al. |
| 9,031,585 B2 | 5/2015 | Kahle et al. |
| 9,038,743 B2 | 5/2015 | Aoki |
| 9,061,392 B2 | 6/2015 | Forgues et al. |
| 9,073,134 B2 | 7/2015 | Koeder et al. |
| 9,126,317 B2 | 9/2015 | Lawton et al. |
| 9,144,875 B2 | 9/2015 | Schlesak et al. |
| 9,193,055 B2 | 11/2015 | Lim et al. |
| 9,216,505 B2 | 12/2015 | Rejman et al. |
| 9,232,614 B2 | 1/2016 | Hiroi |
| 9,233,457 B2 | 1/2016 | Wanek et al. |
| 9,242,356 B2 | 1/2016 | King et al. |
| 9,257,865 B2 | 2/2016 | Hiuggins et al. |
| 9,281,770 B2 | 3/2016 | Wood et al. |
| 2001/0052416 A1 | 12/2001 | Wissmach et al. |
| 2002/0033267 A1 | 3/2002 | Schweizer et al. |
| 2003/0121677 A1 | 7/2003 | Watanabe et al. |
| 2003/0127932 A1* | 7/2003 | Ishida .................. B25F 5/00 310/184 |
| 2003/0173096 A1* | 9/2003 | Setton .................. B23P 19/066 173/176 |
| 2004/0182587 A1 | 9/2004 | May et al. |
| 2005/0035659 A1 | 2/2005 | Hahn et al. |
| 2006/0009879 A1 | 1/2006 | Lynch et al. |
| 2006/0076385 A1 | 4/2006 | Etter et al. |
| 2006/0236827 A1* | 10/2006 | Chiu .................. B25B 13/483 81/475 |
| 2007/0034394 A1 | 2/2007 | Gass et al. |
| 2007/0252675 A1 | 11/2007 | Lamar |
| 2008/0084334 A1 | 4/2008 | Ballew |
| 2008/0086320 A1 | 4/2008 | Ballew |
| 2008/0086323 A1 | 4/2008 | Petrie et al. |
| 2008/0086349 A1 | 4/2008 | Petrie et al. |
| 2008/0086427 A1 | 4/2008 | Wallace |
| 2008/0086428 A1 | 4/2008 | Wallace |
| 2008/0086685 A1 | 4/2008 | Janky et al. |
| 2009/0101376 A1* | 4/2009 | Walker .................. B25B 21/00 173/47 |
| 2009/0250364 A1 | 10/2009 | Gerold et al. |
| 2009/0251330 A1 | 10/2009 | Gerold et al. |
| 2009/0273436 A1 | 11/2009 | Gluck et al. |
| 2010/0032179 A1* | 2/2010 | Hanspers .................. B25F 3/00 173/11 |
| 2010/0089600 A1* | 4/2010 | Borinato .................. B23P 19/066 173/1 |
| 2010/0096151 A1 | 4/2010 | Östling |
| 2010/0116519 A1 | 5/2010 | Gareis |
| 2010/0154599 A1 | 6/2010 | Gareis |
| 2010/0175902 A1* | 7/2010 | Rejman .................. B25D 16/006 173/1 |
| 2010/0176766 A1 | 7/2010 | Brandner et al. |
| 2010/0224356 A1* | 9/2010 | Moore .................. E21B 4/02 166/65.1 |
| 2010/0307782 A1* | 12/2010 | Iwata .................. B25F 5/00 173/1 |
| 2011/0056716 A1 | 3/2011 | Jönsson et al. |
| 2011/0067895 A1 | 3/2011 | Nobe et al. |
| 2011/0139473 A1* | 6/2011 | Braun .................. B25D 16/003 173/20 |
| 2011/0162858 A1 | 7/2011 | Coste |
| 2011/0180284 A1* | 7/2011 | Carrier .................. B25F 5/00 173/1 |
| 2011/0220379 A1* | 9/2011 | Bixler .................. B25F 5/001 173/216 |
| 2011/0303427 A1* | 12/2011 | Tang .................. B23P 19/066 173/1 |
| 2012/0167721 A1 | 7/2012 | Fluhrer |
| 2012/0168189 A1 | 7/2012 | Eckert |
| 2012/0175142 A1* | 7/2012 | Van Der Linde ..... B23B 45/008 173/181 |
| 2012/0292070 A1 | 11/2012 | Ito et al. |
| 2013/0000938 A1* | 1/2013 | Matsunaga .................. B25B 21/008 173/181 |
| 2013/0024245 A1 | 1/2013 | Nichols et al. |
| 2013/0025078 A1* | 1/2013 | Heil .................. A61C 17/221 15/22.1 |
| 2013/0056235 A1* | 3/2013 | Pozgay .................. B25B 21/00 173/29 |
| 2013/0062086 A1 | 3/2013 | Ito et al. |
| 2013/0062088 A1* | 3/2013 | Mashiko .................. B25B 21/02 173/2 |
| 2013/0071815 A1 | 3/2013 | Hudson et al. |
| 2013/0082632 A1 | 4/2013 | Kusakawa |
| 2013/0087355 A1 | 4/2013 | Oomori et al. |
| 2013/0109375 A1 | 5/2013 | Zeiler et al. |
| 2013/0118767 A1 | 5/2013 | Cannaliato et al. |
| 2013/0126202 A1 | 5/2013 | Oomori et al. |
| 2013/0133907 A1 | 5/2013 | Chen et al. |
| 2013/0133911 A1 | 5/2013 | Ishikawa et al. |
| 2013/0133912 A1* | 5/2013 | Mizuno .................. B25B 23/1405 173/180 |
| 2013/0138465 A1 | 5/2013 | Kahle et al. |
| 2013/0138606 A1 | 5/2013 | Kahle et al. |
| 2013/0140050 A1* | 6/2013 | Eshleman .................. B25B 21/00 173/1 |
| 2013/0153250 A1 | 6/2013 | Eckert |
| 2013/0187587 A1 | 7/2013 | Knight et al. |
| 2013/0188058 A1 | 7/2013 | Nguyen et al. |
| 2013/0191417 A1 | 7/2013 | Petrie et al. |
| 2013/0204753 A1 | 8/2013 | Wallace |
| 2013/0255980 A1 | 10/2013 | Linehan et al. |
| 2013/0269961 A1* | 10/2013 | Lim .................. B25F 5/001 173/1 |
| 2013/0304545 A1 | 11/2013 | Ballew et al. |
| 2013/0327552 A1 | 12/2013 | Lovelass et al. |
| 2014/0006295 A1 | 1/2014 | Zeiler et al. |
| 2014/0015389 A1 | 1/2014 | Vatterott et al. |
| 2014/0069672 A1 | 3/2014 | Mashiko et al. |
| 2014/0107853 A1 | 4/2014 | Ashinghurst et al. |
| 2014/0122143 A1 | 5/2014 | Fletcher et al. |
| 2014/0151079 A1 | 6/2014 | Furui et al. |
| 2014/0159662 A1 | 6/2014 | Furui et al. |
| 2014/0159919 A1 | 6/2014 | Furui et al. |
| 2014/0159920 A1 | 6/2014 | Furui et al. |
| 2014/0166324 A1 | 6/2014 | Puzio et al. |
| 2014/0184397 A1 | 7/2014 | Volpert |
| 2014/0231116 A1* | 8/2014 | Pollock .................. B25B 21/00 173/183 |
| 2014/0284070 A1 | 9/2014 | Ng et al. |
| 2014/0292245 A1 | 10/2014 | Suzuki et al. |
| 2014/0324194 A1 | 10/2014 | Larsson et al. |
| 2014/0331830 A1 | 11/2014 | King et al. |
| 2014/0334270 A1 | 11/2014 | Kusakawa |
| 2014/0336810 A1 | 11/2014 | Li et al. |
| 2014/0336955 A1 | 11/2014 | Li et al. |
| 2014/0350716 A1 | 11/2014 | Fly et al. |
| 2014/0365259 A1 | 12/2014 | Delplace et al. |
| 2014/0367134 A1 | 12/2014 | Phillips et al. |
| 2014/0379136 A1 | 12/2014 | Schlegel et al. |
| 2015/0000944 A1 | 1/2015 | Dusselberg et al. |
| 2015/0002089 A1 | 1/2015 | Rejman et al. |
| 2015/0042247 A1 | 2/2015 | Kusakawa |
| 2015/0122524 A1 | 5/2015 | Papp |
| 2015/0135306 A1 | 5/2015 | Winkler et al. |
| 2015/0135907 A1 | 5/2015 | Hirabayashi et al. |
| 2015/0137721 A1 | 5/2015 | Yamamoto et al. |
| 2015/0158157 A1 | 6/2015 | Hirabayashi et al. |
| 2015/0158170 A1 | 6/2015 | Nitsche et al. |
| 2015/0171654 A1 | 6/2015 | Horie et al. |
| 2015/0340921 A1 | 11/2015 | Suda et al. |
| 2016/0031072 A1 | 2/2016 | Lim et al. |
| 2016/0129569 A1 | 5/2016 | Lehnert et al. |
| 2016/0193726 A1* | 7/2016 | Rompel .................. B25D 11/068 173/93.5 |

(56) References Cited

U.S. PATENT DOCUMENTS

2017/0008159 A1    1/2017  Boeck et al.
2017/0165822 A1*   6/2017  Rompel ............... B25D 16/003

FOREIGN PATENT DOCUMENTS

| DE | 202006014606 |      | 1/2007  |
|----|--------------|------|---------|
| EP |      2147750 |      | 1/2010  |
| EP |      2671681 | A2   | 12/2013 |
| JP |    S58181544 | A    | 10/1983 |
| JP |   2000176850 |      | 6/2000  |
| JP |   2004072563 |      | 3/2004  |
| JP |   2006123080 |      | 5/2006  |
| KR |    100782593 | B1   | 12/2007 |
| WO |  WO02030624  |      | 4/2002  |
| WO |  WO2007090258|      | 8/2007  |
| WO |  WO2013116303|      | 8/2013  |

OTHER PUBLICATIONS

Bosch Media Service "Power Tools" Bosch Press Release, Mar. 3, 2016 (3 pages).
Korean Patent Office Action for Application No. 10-2017-7037714 dated Mar. 15, 2019, with English Translation, 15 pages.
Korean Patent Office Action for Application No. 10-20177037714, dated Sep. 26, 2019 (7 pages, English translation included).
Korean Patent Office Notice of Allowance for Application No. 10-20177037714, dated Nov. 12, 2019 (7 pages, English translation included).
Extended European Search Report for Application No. 16803935.2 dated Dec. 14, 2018, 8 pages.

\* cited by examiner

US 10,850,380 B2

MULTI-SPEED POWER TOOL WITH ELECTRONIC CLUTCH

RELATED APPLICATIONS

This application claims priority to U.S. Provisional Patent Application No. 62/169,671, filed on Jun. 2, 2015, and U.S. Provisional Patent Application No. 62/180,586, filed on Jun. 16, 2015, the entire contents of which are hereby incorporated by reference.

FIELD OF THE INVENTION

The present invention relates to an electronic clutch for a power tool.

SUMMARY

One embodiment provides a power tool including a housing, a motor within the housing, a clutch collar on the housing including a plurality of settings, a wireless transceiver operable to form a wireless connection with a remote device, and a processor coupled to the clutch collar and the wireless transceiver. The processor is configured to receive, via the wireless transceiver, a mapping including a plurality of torque levels corresponding to the plurality of settings and detect that the clutch collar is set to a setting of the plurality of settings. The processor is further configured to determine the torque level for the setting from the mapping and detect, during the operation of the power tool, that a torque of the power tool exceeds the torque level. The processor is also configured to generate an indication that the torque exceeds the torque level.

Another embodiment provides a method of operating a power tool including a housing, a motor within the housing, a clutch collar on the housing including a plurality of settings, and an electronic clutch. The method includes receiving, with a processor via a wireless transceiver, a mapping including a plurality of torque levels corresponding to the plurality of settings and detecting, with the processor, that the clutch collar is set to a setting from the plurality of settings. The method also includes determining, with the processor, the torque level for the setting from the mapping, and detecting, with the processor, that a torque of the power tool exceeds the torque level during operation of the power tool. The method further includes generating, with the processor, an indication that the torque exceeds the torque level.

Another embodiment provides a method of operating a housing, a motor within the housing, a clutch collar on the housing including a plurality of settings, and an electronic clutch. The method includes receiving, with a processor via a wireless transceiver, a first torque value generated by a remote device based on user input and wirelessly transmitted by the remote device to the wireless transceiver. The method further includes the processor detecting that the clutch collar is set to a setting of the plurality of settings. The processor calculates a torque level for the setting based on the position of the setting among the plurality of settings and the first torque value. The method further includes controlling the motor based on the torque level.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
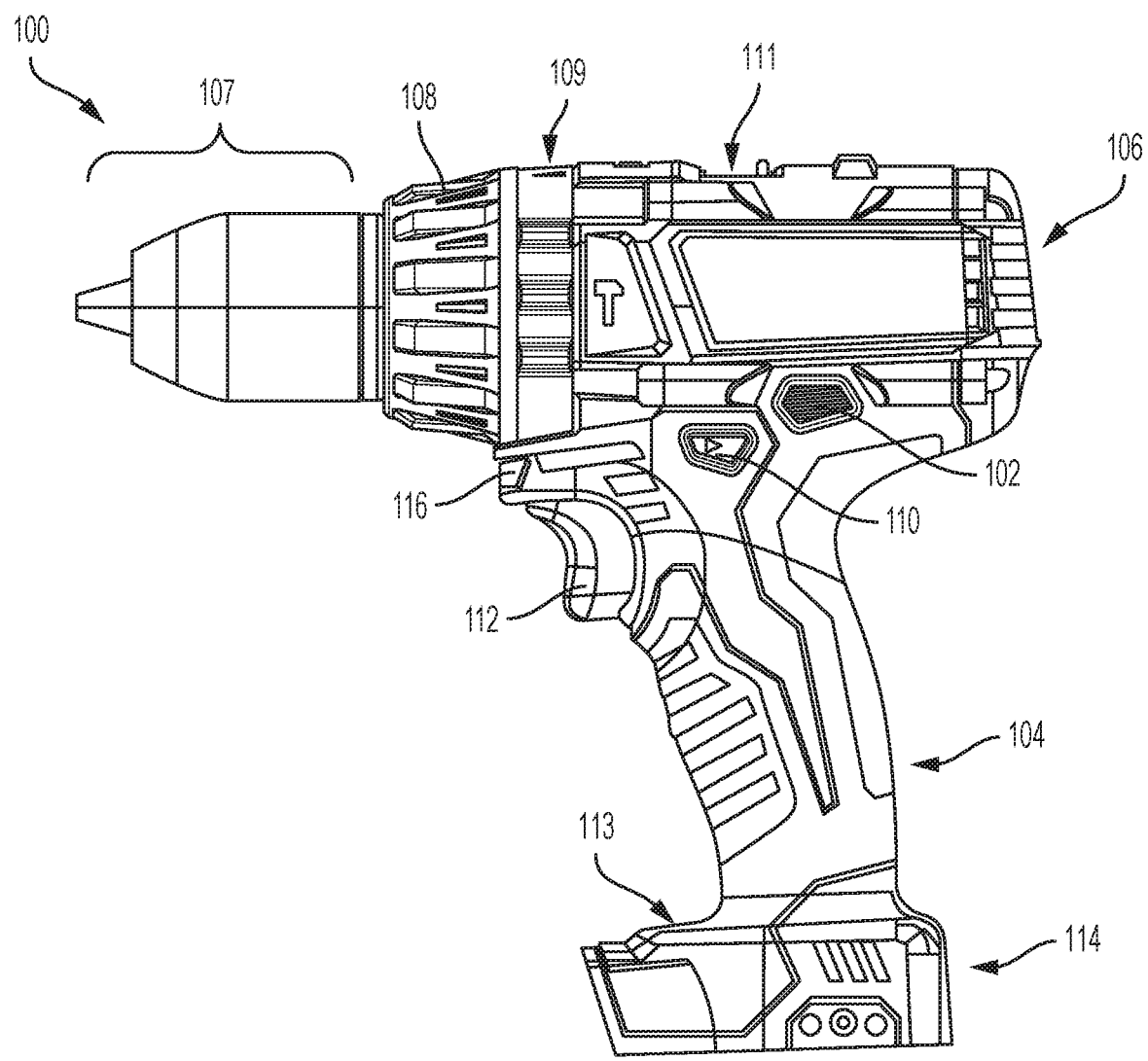
FIGS. 1A and 1B illustrate a power tool according to some embodiments.
Figure 1B:
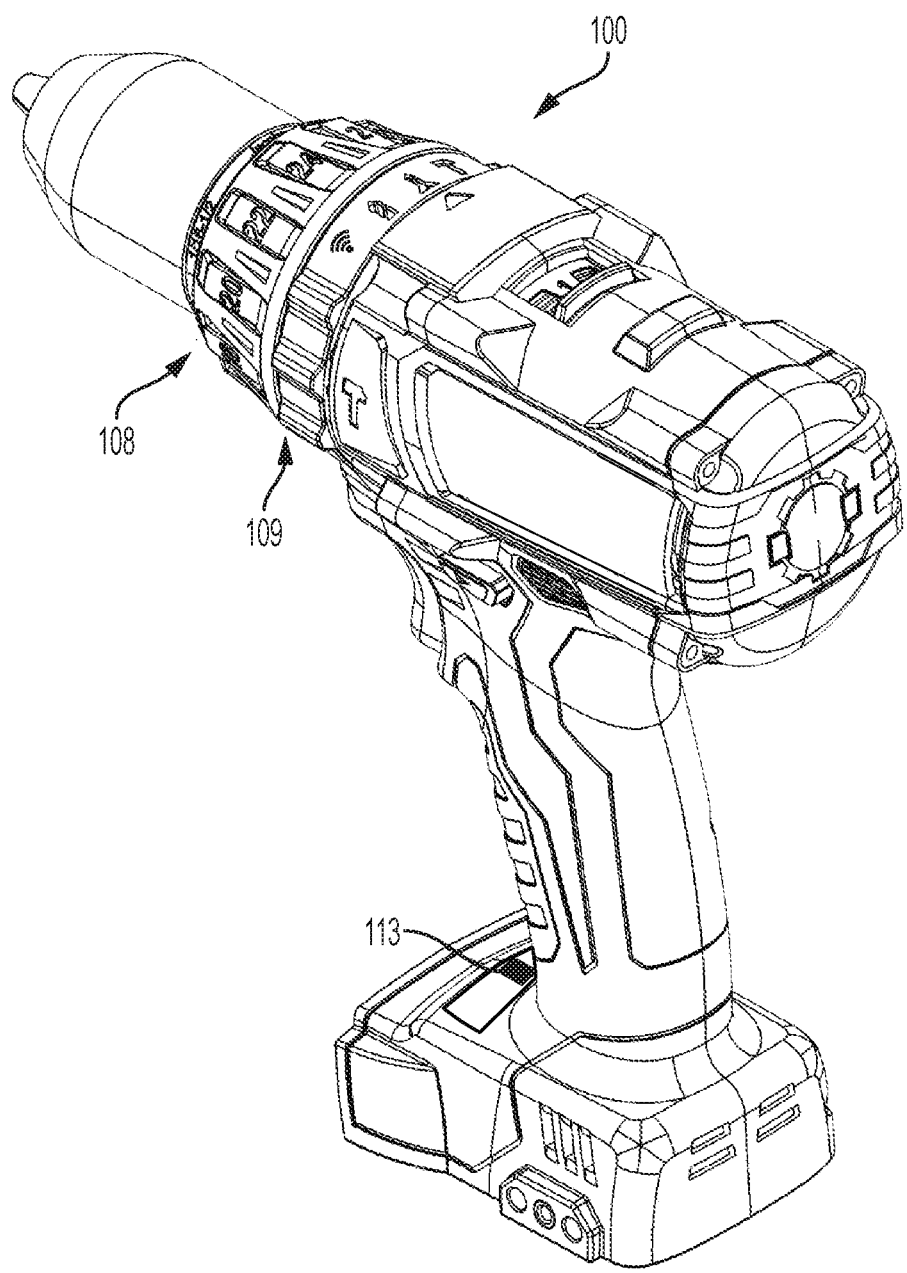

FIGS. 1A-B illustrate a power tool 100 incorporating a brushless direct current (DC) motor. In a brushless motor power tool, such as power tool 100, switching elements are selectively enabled and disabled by control signals from a controller to selectively apply power from a power source (e.g., battery pack) to drive a brushless motor. The power tool 100 is a brushless hammer drill having a housing 102 with a handle portion 104 and motor housing portion 106. The power tool 100 further includes an output unit 107, a clutch selector ring (or clutch collar) 108, a mode selector ring 109, forward/reverse selector 110, speed select switch 111, trigger 112, a mode selector pushbutton 113, a battery interface 114, and light 116. The mode selector ring 109 allows a user to select between a drilling mode, a driving mode, a hammering mode, and an adaptive mode. When in the adaptive mode, the mode selector pushbutton 113 may be activated (e.g., pushed) to cycle through adaptive modes defined by control profiles of the tool 100. The clutch collar 108 allows a user to select between various clutch settings, such as settings 1-13 or the even values between 2-26 (i.e., settings 2, 4, 6, 8, . . . 24, 26). Other embodiments include a clutch collar 108 having fewer or more setting options. The speed select switch 111 is a two-position switch that slides between a high speed and a low speed. In some embodiments, the speed select switch 111 includes additional speed settings (e.g., high, medium, and low).

Figure 2:
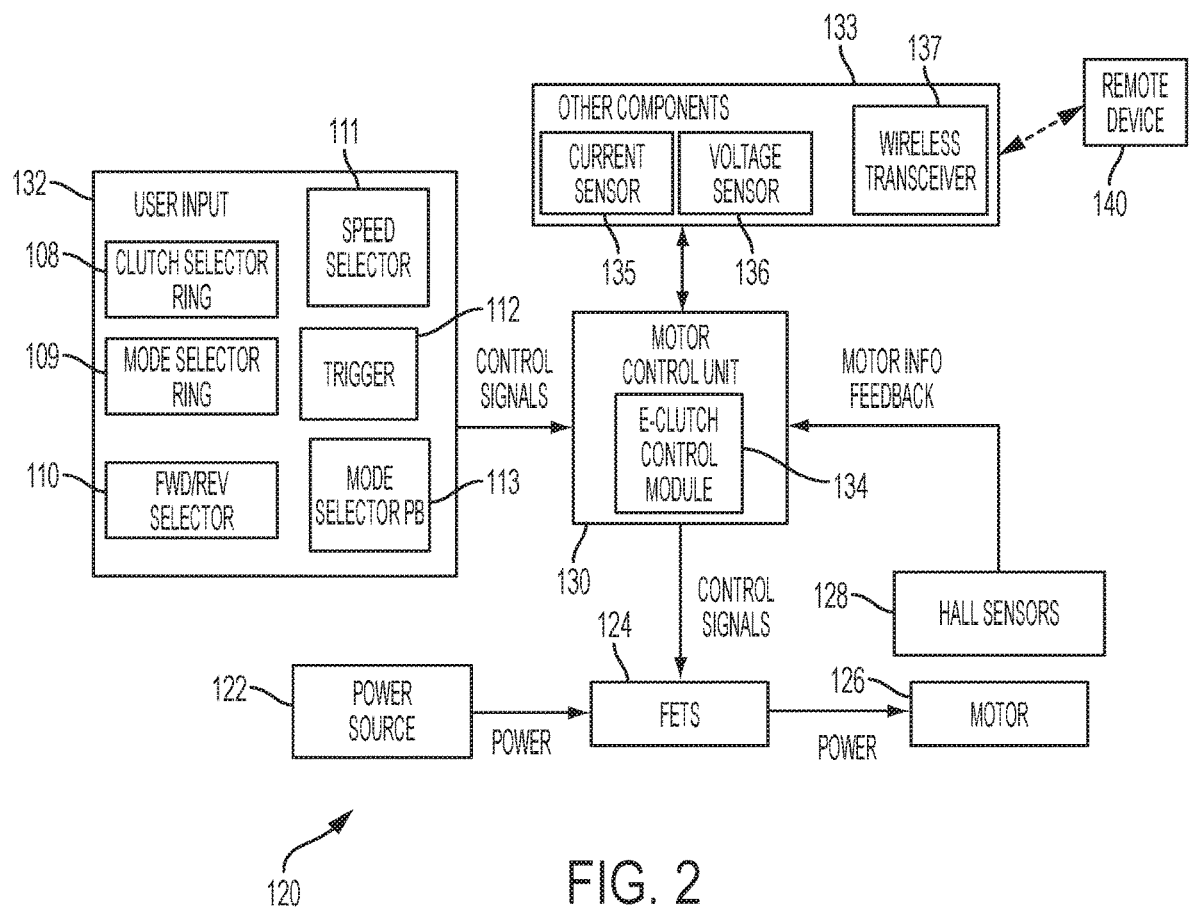
FIG. 2 illustrates a block diagram of the power tool according to some embodiments.

FIG. 2 illustrates a simplified block diagram 120 of the power tool 100, which includes a power source 122, field effect transistors (FETs) 124, a motor 126, Hall sensors 128, a motor control unit 130, user input 132, and other components 133 (battery pack fuel gauge, work lights (e.g., light emitting diodes (LEDs), such as the light 116), a current sensor 135, a voltage sensor 136, and a wireless transceiver 137). The power source 122 provides DC power to the various components of the power tool 100 and may be a power tool battery pack that is rechargeable and uses, for instance, lithium ion cell technology. In some instances, the power source 122 may receive alternating current (AC)

power (e.g., 120V/60 Hz) from a tool plug that is coupled to a standard wall outlet, and then filter, condition, and rectify the received power to output DC power.

Each of the Hall sensors 128 outputs motor feedback information, such as an indication (e.g., a pulse) when a magnet of the motor's rotor rotates across the face of that Hall sensor. Based on the motor feedback information from the Hall sensors 128, the motor control unit 130 can determine the position, velocity, and acceleration of the rotor. The motor control unit 130 also receives user controls from user input 132, such as by depressing the trigger 112 or shifting the forward/reverse selector 110. In response to the motor feedback information and user controls, the motor control unit 130 transmits control signals to control the FETs 124 to drive the motor 126. By selectively enabling and disabling the FETs 124, power from the power source 122 is selectively applied to stator coils of the motor 126 to cause rotation of a rotor. Although not shown, the motor control unit 130 and other components of the power tool 100 are electrically coupled to the power source 122 such that the power source 122 provides power thereto.

The current sensor 135 detects current to the motor, for example, by detecting current flowing between the power source 122 and the FETS 124 or between the FETS 124 and the motor 126, and provides an indication of the current sensed to the motor control unit 130. The voltage sensor 136 detects voltages of the power tool 100, such as a voltage level of the power source 122 and a voltage across the motor 126. The wireless transceiver 137 provides a wireless connection between the motor control unit 130 and an external device to enable wireless communication with the external device, such as a remote device 140.

In some embodiments, the motor control unit 130 includes a memory and an electronic processor configured to execute instructions stored on the memory to effect the functionality of the motor control unit 130 described herein.

The tool 100 includes an electronic clutch, also referred to as an e-clutch. More particularly, the tool 100 includes an e-clutch control module 134. The e-clutch control module 134 may be implemented in hardware, software, or a combination thereof. In the illustrated embodiment, the e-clutch control module 134 includes instructions stored on and executed by the motor control unit 130 to implement the e-clutch functionality described herein. The e-clutch control module 134 takes input from a user from the clutch collar 108. As will be discussed in more detail below, the clutch collar 108 provides the user a rotatable selector that provides an electrical signal indicative of the user selection to the e-clutch control module 134. The position of the speed select switch 111, which a user can toggle between two settings (for example, a high speed setting ("1") and a low speed setting ("2")), is monitored by the e-clutch control module 134 as well.

The user selection on the clutch collar 108 is translated into a desired/target torque output level for the tool 100. Then, when the tool 100 is in operation, the e-clutch control module 134 calculates an output torque of the power tool by taking into account one or more of a gear ratio, battery current, effect of speed control or pulse-width-modulation (PWM) on root mean squared (RMS) current, and changes in motor velocity and acceleration. For example, the e-clutch control module 134 calculates the output torque based on a current flowing to the motor 126 as sensed by the current sensor 135. When the target torque is reached, the motor control unit 130 generates an indication of reaching the target torque by one or more of stopping the tool 100 from further driving, shaking (i.e., ratcheting) the motor 126 to indicate that the target torque has been reached, and flashing the light 116 to indicate that the target torque has been reached.

The clutch collar 108 allows the user to select the desired torque level at which the tool 100 clutches. The clutch collar 108 is able to rotate continuously and is not limited, for example, to a single revolution or 360 degrees of rotation. In other words, the clutch collar 108 is able to be rotated multiple revolutions (i.e., more than 360 degrees of rotation). The continuous rotation feature allows the clutch collar 108 to go from a maximum torque setting (e.g., at a 0 degree rotational position) to the minimum torque setting (e.g., at a 359 degree rotational position), which are adjacent, more quickly than if the clutch collar 108 had to rotate back through the various intervening settings between the maximum and minimum setting.

In other embodiments, the clutch collar 108 is limited in rotation, for example, by a rotational stop physically blocking rotation beyond a certain point (e.g., 180 degrees, 270 degrees, 300 degrees, 360 degrees, 540 degrees, 720 degrees, an amount between 300 and 360 degrees, or another degree amount). As an example, the clutch collar 108 may include a projection that rotates with the collar and the motor housing 106 may have a fixed tab (i.e., a rotational stop). The clutch collar 108 is free to rotate until the projection abuts the fixed tab. The projection and tab may be internal (i.e., inside the clutch collar 108 and motor housing 106, respectively) or external (i.e., on an outside surface of the clutch collar 108 and the motor housing 106, respectively).

The clutch collar 108 includes a wiper (not shown) that contacts one of several resistive elements, each associated with a particular clutch setting. The particular resistive element contacted by the wiper depends on the rotational position of the clutch collar 108.

Figure 3A:
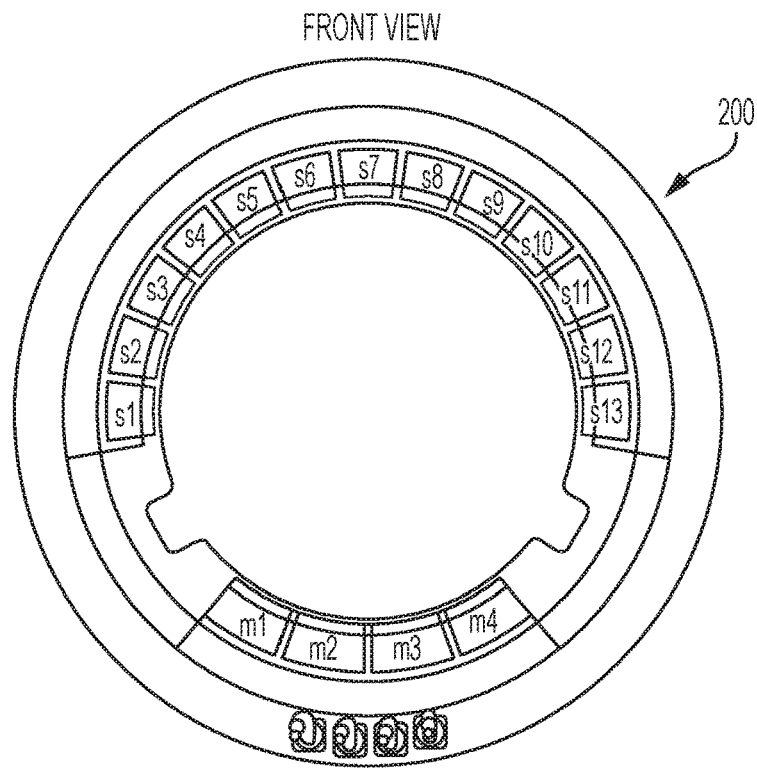
FIGS. 3A and 3B illustrate a printed circuit board assembly associated with the power tool of FIGS. 1A and 1B according to some embodiments.
Figure 3B:
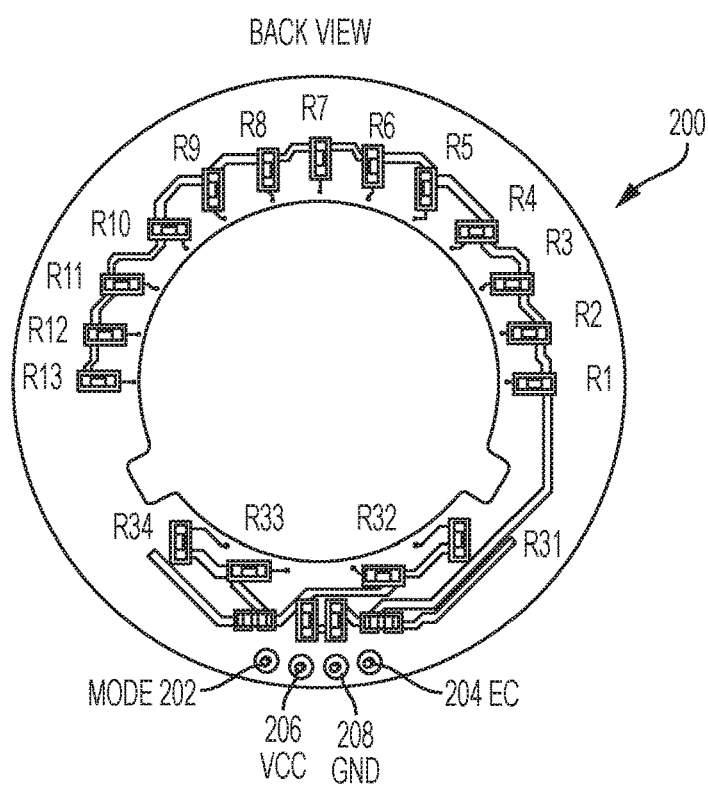
Figure 4:
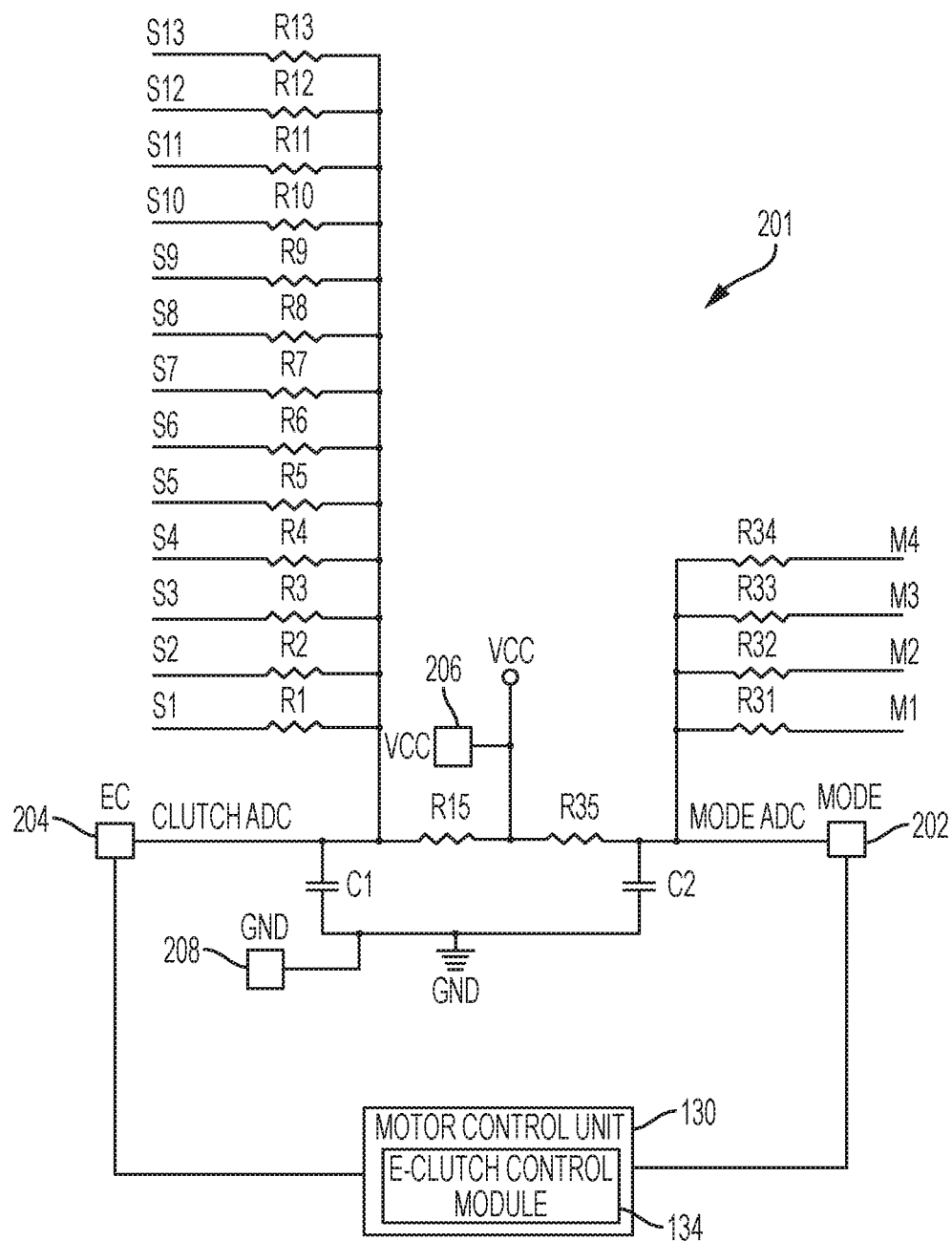
FIG. 4 illustrates a circuit diagram of the printed circuit board assembly of FIGS. 3A and 3B according to some embodiments.
Figure 5:
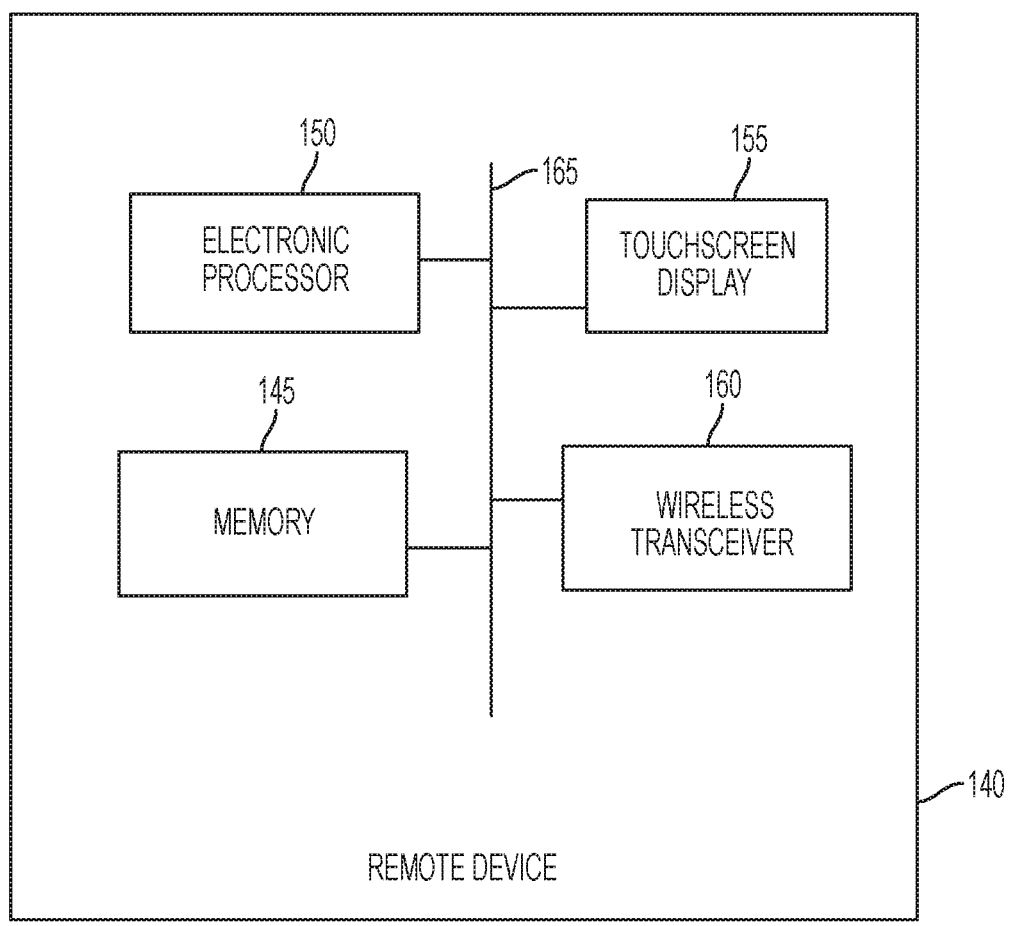
FIG. 5 illustrates a block diagram of a remote device according to some embodiments.

For instance, FIGS. 3A-B illustrate a front side and a back side, respectively, of a printed circuit board assembly (PCBA) 200 associated with the clutch collar 108, and FIG. 4 illustrates a circuit diagram 201 of the PCBA 200 coupled to the motor control unit 130. The PCBA 200 includes a mode pin 202, an e-clutch (EC) pin 204, a power pin (Vcc) 206, and a ground pin (GND) 208. As shown in FIG. 5, the mode pin 202 and the e-clutch pin 204 are coupled to input pins of the motor control unit 130. The PCBA 200 also includes thirteen surface mount resistors, R1-R13, each having a different resistance value and conductively coupled to a different one of thirteen wiper connection points (S1-S13) and being associated with a different one of the thirteen clutch settings (1-13). When a user rotates the clutch collar 108 and stops at a particular clutch setting (e.g., 2), the wiper contacts a conductive PCBA track (e.g., wiper connection point S2) of the associated resistor (e.g., R2) to complete a circuit including the e-clutch pin 204. The conductive tracks for the thirteen resistors are viewable on the front side of the PCBA 200 in FIG. 3A. The motor control unit 130 and, particularly, the e-clutch control module 134, receives an electronic signal indicating that the wiper has contacted the particular resistor (e.g., R2). The e-clutch control module 134 interprets the signal and determines that the user has selected a particular setting (e.g., 2). From the user perspective, the clutch collar has an interface similar to a mechanical clutch, ensuring that the user will understand how to use the clutch.

In some embodiments, the ability to continuously rotate the clutch collar 108 (e.g., multiple revolutions in the clockwise direction, and the counter-clockwise direction), allows the clutch collar 108 to specify more settings than wiper-resistor positions on the PCBA 200. For instance, when rotating the clutch collar 108 so that the wiper moves clockwise on the PCBA 200 shown in FIG. 3A (going from S1 to S2 through S13), if the user continues to rotate the clutch collar 108 past position S13, eventually the wiper will again contact position S1. The e-clutch control module 134 determines, based on outputs from the e-clutch pin 204, that the clutch collar 108 went from position S13 to S1 without going through positions S12-S2. Thus, this position S1 can be treated as a fourteenth position (S14). If the clutch collar 108 continues to rotate in the clockwise direction, each subsequent position is likewise treated as a new position. For example, S2 would be a fifteenth position (S15), S3 would be a sixteenth position (S16), and so on. A similar expansion of positions is provided through rotating the clutch collar 108 counter clockwise to go directly from position S1 to S13, without going through intervening positions S2-S12.

Accordingly, the continuously rotating clutch collar 108 essentially allows an infinite number of settings to be indicated, as a user can continuously rotate in a first direction to continuously increment the torque setting, and continuously rotate in the opposition direction to decrement the torque setting. In turn, the e-clutch control module 134 can provide a maximum and minimum torque setting (e.g., in software) where, for instance, further increments from the clutch collar 108 are ignored because the maximum setting has been reached. Additionally, the increased number of setting positions allows tuning of a torque setting with finer granularity. For instance, rather than dividing up the potential torque settings among thirteen positions, the e-clutch control module 134 can divide the same range of potential torque settings among 26, 39, 50, 100, or another number of positions.

The PCBA 200 is further associated with the mode selector ring 109 to allow a user to select between the drilling mode, driving mode, hammering mode, and adaptive mode. The PCBA 200 includes further surface mount resistors R31, R32, R33, and R34 on the bottom portion of the PCBA 200, each resistor being conductively coupled to a wiper connection point (M1-M4) and being associated with one of the four modes for selection. Similar to the clutch collar 108, the mode selector ring 109 includes a wiper that contacts a resistive element (R31-R34) to complete a circuit and indicate the mode selection to the motor control unit 130, albeit the signal is output via the mode pin 202, rather than the e-clutch pin 204.

The position of the speed select switch 111, which a user can toggle between two settings (e.g., a "1" and "2"), is monitored by the e-clutch control module 134 as well. A similar resistor, wiper, and PCBA track setup as described with respect to FIGS. 3A, 3B, and 4 is used to track the position of the speed select switch 111 and, therefore, the user's selection of the speed setting (gear ratio) of the tool 100. In some embodiments, the e-clutch control module 134 receives the speed setting and accounts for the gear ratio of the speed setting such that a consistent output torque for a given clutch setting is obtained regardless of the of speed setting selected. In other embodiments, the e-clutch control module 134 applies a different target torque dependent on the speed setting such that a different output torque is obtained for a given clutch setting at different speed settings.

In other embodiments, rather than a wiper-resistor ring technique, different clutch collar selection and mode selection user interface technology is used, such as inputs using mutual inductive sensing and capacitive sensing.

The e-clutch control module 134 estimates the output torque of the tool 100 (torque at the shaft) using a measurement of battery current. The current sensor 135, or another sensor used to infer battery current, provides a measurement to the e-clutch control module 134. For instance, to determine battery current, the current sensor 135 may be positioned to measure the current along the connection between the power source 122 and the FETs 124 labeled "power" in FIG. 2.

The current-torque relationship is fairly linear, and the relationship depends on a motor constant (e.g., torque per unit current (k_t)), gear ratio, gear friction, motor speed and other factors. Determining the output torque of the tool 100 based on current may be improved by subtracting current that is due to motor inertia from the measured battery current. The inertia is specific to the motor used and takes into account the effects of velocity and acceleration. Taking motor inertia into consideration when estimating torque assists in preventing inadvertent shutdowns on startup or due to changes in the trigger position, where the current-torque relationship can sometimes be non-linear, unreliable, or both. The current-to-torque calculation may also be improved by calculating an RMS current based on the measured battery current, a PWM duty ratio, and motor design characteristics. This calculation helps maintain a similar torque output across different PWM duty ratios. The output torque calculation may also account for the gear ratio of the power tool 100, which is selected by the user via the speed select switch 111. For example, the output torque calculation includes one or more of different offsets and constants, which may be empirically determined, to compensate for the different speed settings (i.e., gear ratios) selectable by the speed select switch 111.

The calculated output torque is compared against the threshold torque level set by the user (e.g., via the clutch collar 108) and the tool 100 provides feedback when the threshold torque level is met or exceeded. In some embodiments, because the output torque calculation takes into consideration and accounts for the gear ratio indicated by the speed select switch 111, regardless of the particular speed setting selected, the tool 100 achieves approximately the same torque output for a particular torque setting (e.g., "2") selected by the user via the clutch collar 108. A torque level (or, torque value) that is considered approximately the same as another torque level may vary by embodiment and may be, for example, within 2% of the other torque level, within 5% of the other torque level, or within 10% of the other torque level.

The tool 100 indicates to the user that the desired torque has been reached by ratcheting the motor and flashing the light 116. By ratcheting the motor 126, the e-clutch control module 134 simulates to the user the ratcheting feel and sound of a mechanical clutch. This technique makes the experience for the user similar to a mechanical clutch and it is also cost effective because no additional hardware is needed. The e-clutch control module 134 will also control the light 116 to blink when the tool 100 has reached the selected target torque.

The feedback (e.g., ratcheting) intensity is scaled up and down with the desired output torque to prevent the ratcheting from being stronger than the target torque, while maximizing or ensuring the effectiveness of the feedback to the user. The ratcheting of the motor 126 is implemented by controlling a pulse-width modulated (PWM) signal generated by the motor control unit 130 to drive the motor 126 (via the FETS 124) to be output in short bursts. For instance, the PWM signal generated by the motor control unit 130 cycles between an active state with a non-zero percent duty cycle for a first time period, and an inactive (off) state with a zero or near zero percent duty cycle for a second time period. In some instances, the frequency and duty cycles for the active and inactive periods of the PWM signal may vary during the course of ratcheting. The amount of motor ratcheting generated is based on the target torque selected by the user. More particularly, the higher the target torque selected (e.g., as indicted by the clutch collar 108 and determined by the motor control unit 130), the more motor ratcheting generated by the tool 100 to indicate when the target torque is reached. Similarly, the lower the target torque selected, the less motor ratcheting generated by the tool 100 to indicate when the target torque is reached. Scaling the motor ratcheting in accordance with the selected target torque level 1) prevents over-torqueing a fastener from the ratcheting motion itself, which could occur if the amount of motor ratcheting is too high; and 2) allows a level of motor ratcheting commensurate with the driving action so as to be low enough at low torques to not startle the user and high enough at high torques to be felt and recognized by the user.

To scale the intensity of the motor ratcheting, the length of time that the PWM signal is active and not active can be adjusted. Generally, the longer the active time period, the more intense the ratcheting effect. Similarly, the duration of the inactive time period of the PWM signal can be adjusted to increase and decrease the intensity of the ratcheting feedback. Generally, the longer the PWM signal is inactive, the less intense the ratcheting feedback. For instance, to increase the intensity of the ratcheting, the time period that the PWM signal is active is increased, the time period that the PWM signal is inactive is decreased, or both.

The particular threshold torque level used by the tool 100 varies depending on the selected mode of the tool 100. When in the drilling mode and the hammering mode, as selected via the mode selector ring 109, the tool 100 generally does not implement threshold torque levels as described above. When in the driving mode, the e-clutch control module 134 uses the default threshold torque level setting assigned to the currently selected torque setting indicated by the rotational position of the clutch collar 108. The e-clutch control module 134 may include a mapping of default threshold torque levels corresponding to the settings of the clutch collar 108. When in the adaptive mode, as indicated by the mode selector ring 109 based on a user selection, the tool 100 may operate implement threshold torque levels as described above. The threshold torque levels may be set through wireless communications between the power tool 100 and the remote device 140, as described in further detail below.

FIG. 5 illustrates a block diagram of the remote device 140. The remote device 140 may be, for example, a smart phone, laptop, tablet, desktop, or other computing device. The remote device 140 includes a memory 145, an electronic processor 150, a touchscreen display 155, and a wireless transceiver 160 coupled by a bus 165. The memory 145 stores instructions, including those for a graphical user interface, that are executed by the electronic processor 150 to perform the processing functions of the remote device 140 described herein. The touchscreen display 155 displays information for a user and receives input from a user. The touchscreen display 155 is one example of a user interface and, in some embodiments further or alternative user interface elements are included in the remote device 140, such as pushbuttons, speakers, keyboards, and the like. The electronic processor 150 is operable to execute instructions of the memory 145 to generate a graphical user interface (GUI) on the touchscreen display 155, such as the GUIs 250 and 300 described in further detail below. The wireless transceiver 160 is configured to form a wireless communication link with the wireless transceiver 137 of the power tool 100 (FIG. 2) to enable the electronic processor 150 to communicate with the motor control unit 130 (and the e-clutch control module 134 thereof) of the power tool 100. The wireless transceivers 137, 160 may use the Bluetooth® communication protocol, Wi-Fi® communication protocol, or another wireless protocol.

Figure 6A:
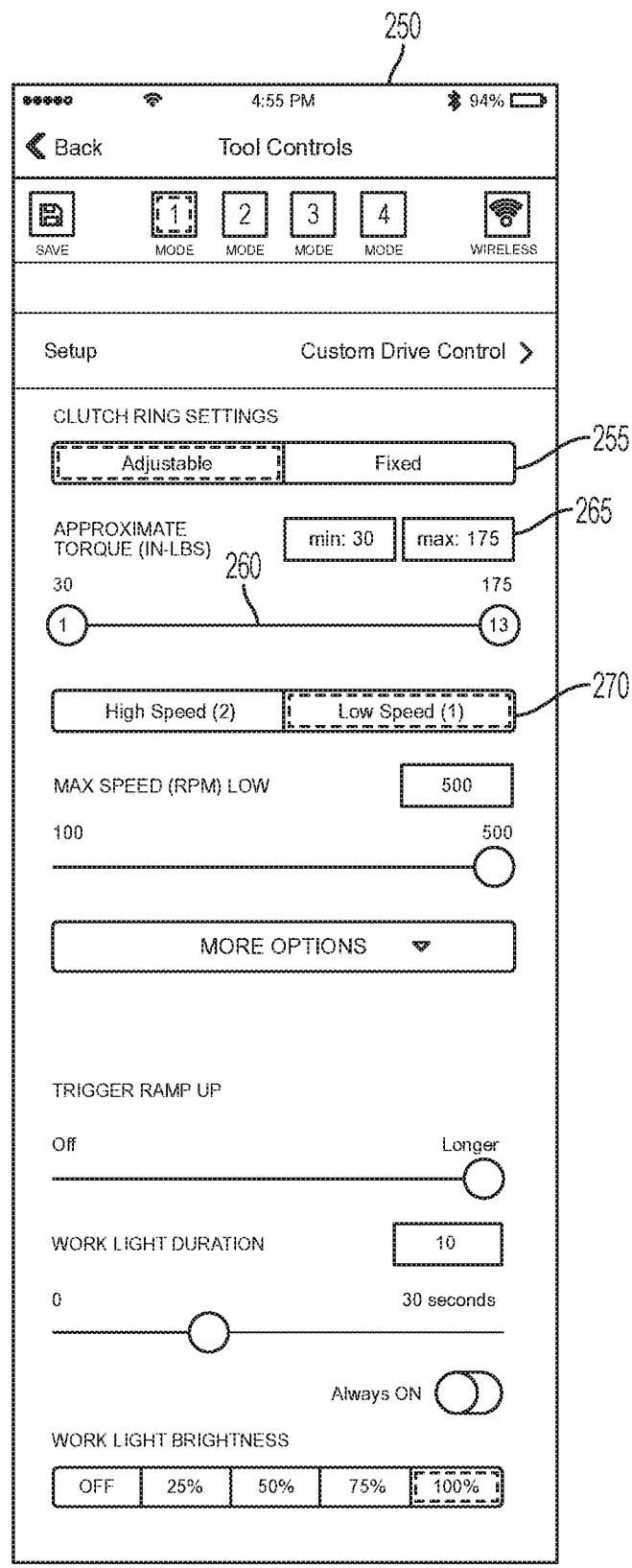
FIGS. 6A and 6B illustrate a graphical user interface of a remote device associated with the power tool of FIGS. 1A and 1B according to some embodiments.
Figure 6B:
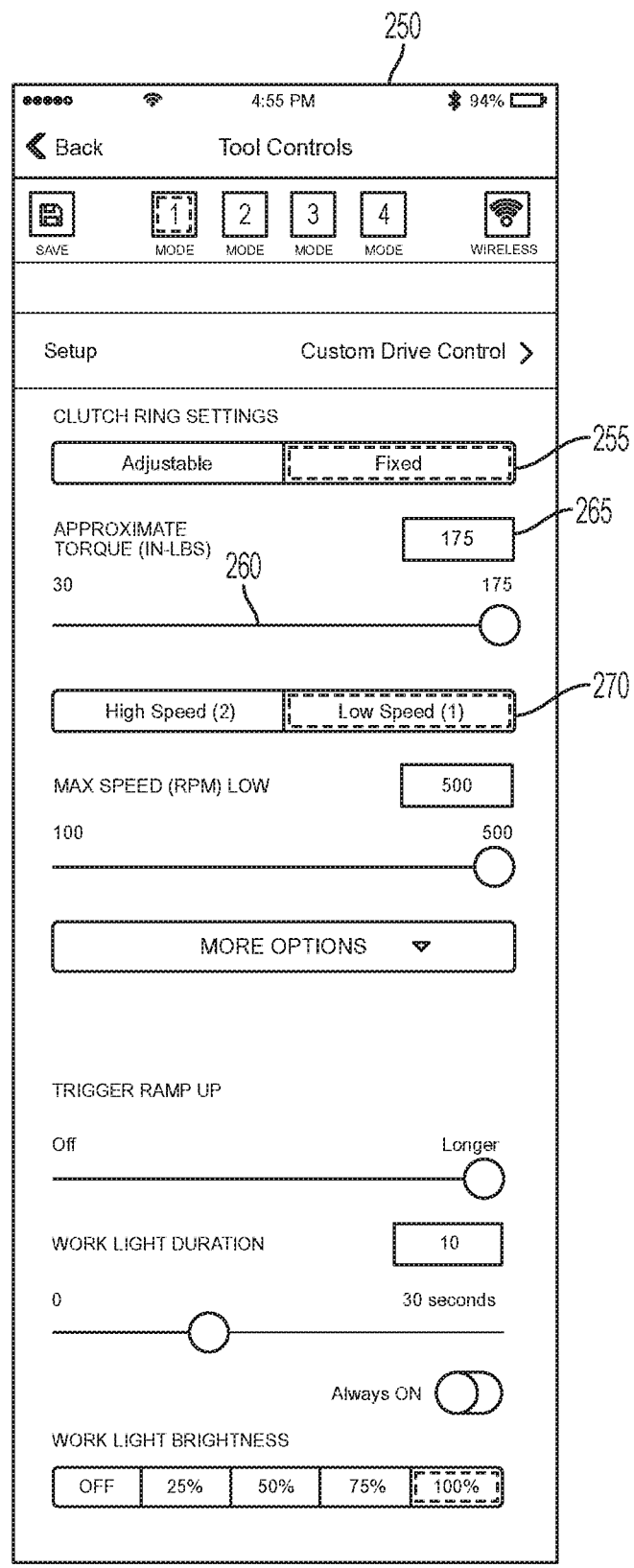

FIGS. 6A and 6B illustrate a GUI 250 generated by the remote device 140 and configured to receive user input specifying a control provide (e.g., a custom drive control profile), and to generate and transmit to the motor control unit 130 the custom drive control profile to configure operation of the power tool 100. The power tool 100 and, in particular, the motor control unit 130, may store multiple control profiles, which may be provided and updated by the remote device 140. A control profile includes various tool operating parameters used by the motor control unit 130 to control the power tool 100. When in the adaptive mode, as indicated by the mode selector ring 109, the motor control unit 130 may cycle through and select the particular control profile to employ for operation of the power tool 100 in response to depressions of the mode selector pushbutton 113 by a user. For example, the power tool 100 may include four control profiles at a given moment, and each time the mode selector pushbutton 113 is depressed, the selected control profile used by the motor control unit 130 to control the power tool changes (e.g., from profile one, to profile two, to control profile three, to profile four, back to profile one, and so on). In other embodiments, more or less control profiles are stored on the power tool 100, or only a single control profile is stored on the power tool 100.

The GUI 250 is operable to receive a user selection of the adjustable mode or the fixed mode via a clutch ring settings selector 255 (see, e.g., FIGS. 6A and 6B). For the fixed mode, a set-up screen of which is shown in FIG. 6B, the remote device 140 receives a user selection, via a slider 260 or text box 265, of a particular fixed torque level (e.g., 75 in-lbs.) or a particular percentage of available torque (e.g., 75% (of maximum available torque)). The selected fixed torque level, along with an indication of the fixed torque mode, is part of a custom drive control profile that is then wirelessly communicated to the tool 100 and, more particularly, to the e-clutch control module 134. This selected torque level is then used by the e-clutch control module 134 as the torque threshold for the tool 100, regardless of the position of the clutch collar 108.

Alternatively, the power tool 100 may receive a custom drive control profile from the remote device 140 indicating that the tool 100 is to operate in the adjustable mode. In the adjustable mode, a set-up screen of which is shown in FIG. 6A, the torque threshold used by the e-clutch control module 134 is the torque level assigned to the currently selected torque setting indicated by the rotational position of the clutch collar 108. Initially, the torque levels assigned to the various torque settings of the clutch collar 108 are the default torque levels that are also used in the driving mode. However, via the remote device 140, the user can assign new torque levels to the various settings available to be selected by the clutch collar 108, over-writing or being used in place of the default torque levels. The GUI 250 receives the user assignment of torque levels to settings of the clutch collar 108 (a mapping), and provides the mapping via the wireless transceiver 160 to the e-clutch control module 134 as part of a control profile. The e-clutch control module 134 may store the mapping to a memory of the motor control unit 130.

In an example mapping generation by the GUI 250, the user is able to assign a maximum and minimum torque level (via the slider 260 or text boxes 265) that can be selected via the clutch collar 108, such that the lowest torque setting of the clutch collar 108 is assigned the minimum torque level selected and the highest torque setting of the clutch collar 108 is assigned the maximum torque level selected. The remaining intermediate torque settings are then assigned a proportional torque level between the minimum and maximum torque levels. For instance, assuming thirteen torque settings (1-13) on the clutch collar 108 and a user selecting a minimum torque level of 50 inch-pounds (in.-lbs.) and a maximum torque level of 110 in.-lbs., the remote device 140 will assign the following torque levels to the tool 100, in some embodiments:

TABLE I

| Torque Setting (Clutch Collar Position) | Torque level (in-lbs.) | Torque level (% of maximum torque) |
| --- | --- | --- |
| 1 | 50 | 29% |
| 2 | 55 | 32% |
| 3 | 60 | 35% |
| 4 | 65 | 38% |
| 5 | 70 | 41% |
| 6 | 75 | 44% |
| 7 | 80 | 47% |
| 8 | 85 | 50% |
| 9 | 90 | 53% |
| 10 | 95 | 56% |
| 11 | 100 | 59% |
| 12 | 105 | 62% |
| 13 | 110 | 65% |

These assigned values assume a linear scale between minimum and maximum values. However, in some instances, non-linear scales are used, such as an exponential scale. In some embodiments, the GUI 250 may receive a selection of the scale to apply via user input. The maximum and minimum selected torque levels can also be expressed as a percentage of the maximum torque available. For instance, the right column of the above table illustrates the torque levels expressed as a percentage. Furthermore, as noted above with respect to the continuously rotating feature of the clutch collar 108, more or fewer than 13 torque setting positions are assigned a torque level in some embodiments. For instance, each increment or decrement of the position of the clutch collar 108 can increment or decrement, respectively, the torque level by 1 in-lb (or by 1% of maximum torque) until the maximum or minimum torque levels are reached.

The GUI 250 further includes a speed setting selector 270 to select between a high speed mapping and a low speed mapping. In other words, the GUI 250 is operable to receive torque levels for a first mapping when the high speed mapping is selected via the speed setting selector 270, and to receive torque levels for a second mapping when the low speed mapping is selected via the speed setting selector 270. The remote device 140 is further operable to generate and provide to the motor control unit 130 a profile including the first mapping applicable when the power tool is in the high speed setting and the second mapping applicable when the power tool is in the low speed setting (selected via the speed select switch 111).

In some embodiments, the profile provided to the power tool 100 based on user input received by the GUI 250 may indicate that, in one of the speed settings (e.g., the high speed setting), the power tool 100 is in the adjustable mode and, in the other of the speed settings (e.g., the low speed setting), the power tool is in the fixed mode. For example, with the low speed mapping selected on the GUI 250 via the speed setting selector 270, the GUI 250 may receive a selection of the adjustable mode via the clutch ring settings selector 255. Further, with the high speed mapping selected on the GUI 250 via the speed setting selector 270, the GUI 250 may receive a selection of the fixed mode via the clutch ring settings selector 255. The remote device 140 then generates a profile including a first mapping and the adjustable mode for the low speed setting and a fixed torque level and the fixed mode indication for the high speed setting. Accordingly, a user is operable to cycle the power tool 100, by moving the speed select switch 111, between an adjustable mode whereby the user may specify a torque level via the clutch collar 108 and a fixed mode whereby the torque level is fixed (based on input via the GUI 250).

The profile generated by the remote device 140 and provided to the power tool 100 based on the GUI 250 may further include a maximum speed for the motor 126 (one for each of the high and low speed setting), a trigger ramp up parameter indicating a pace at which the motor 126 should ramp up to a desired speed, a work light duration indicating how long to keep the light 116 enabled (e.g., after the trigger 112 is pressed or released), and a work light brightness level.

Using the e-clutch control module 134, clutch collar 108, and remote device 140, rather than a traditional mechanical clutch, allows for more sophisticated mappings of torque control. A mechanical input (clutch collar 108) provides the user with a mechanical input mechanism on the tool 100 that is coupled with programmable electronic control to provide greater tool customization, intelligence, and usability. The ability to remap the torque settings selectable by the clutch collar 108 results in a tool 100 having an extended user interface, where the indications that are provided by the mechanical input are programmable and are not fixed. For instance, torque setting "2" is not fixed to indicate 55 in-lbs. (or another value) of torque. Rather, via the remote device 140, the meaning of a particular output signal from the mechanical input can be remapped by the user to indicate something different to the motor control unit 130 and e-clutch control module 134. The particular indication from the mechanical input, specified through the mapping, is then used to control the motor in a certain predetermined manner. This extended user interface provided by the remote device 140 provides extended functionality and customization of the tool 100, which has limited surface real estate for additional user interface components.

In some embodiments, the e-clutch control module 134 limits the maximum allowable torque setting to be that which is allowable according to applicable laws, rules, or regulations for a driving tool without a side handle. In some embodiments, the e-clutch control module 134 receives an input regarding whether a side handle is present on the tool and limits the maximum allowable torque setting based on the input. More particularly, when the e-clutch control module 134 determines that the side handle is not present, the maximum allowable torque setting is limited to that which is permitted according to applicable laws, rules, or regulations. When the e-clutch control module 134 determines that the side handle is present, the maximum torque setting allowable is permitted to be higher than when the side handle is not present. The higher maximum torque setting may again be limited by applicable laws, rules, or regulations for a driving tool with a side handle.

In some embodiments, a switch on the tool 100 allows a user to indicate to the e-clutch control module 134 whether a side handle is present. The switch may be similar in function and structure to the speed select switch 111, may be a push button, or another electro-mechanical input device that provides an output to the e-clutch control module 134 indicative of whether a side handle is present. In another embodiment, attaching the side handle to the tool itself actuates a switch that provides an indication to the e-clutch control module 134 of the presence of the side handle, and removal of the handle provides an indication to the e-clutch control module 134 that that the side handle has been removed. In another embodiment, the GUI of the remote device 140 includes an input (e.g., radio buttons or two-position slider) enabling a user to select or toggle between a side handle on indication and a side handle off indication. This selection is then communicated to the e-clutch control module 134 and used as described above to set the maximum allowable torque setting.

As noted above, the tool includes a speed selector switch 111 allowing the user to select between two gear ratios, which results in a different output speed range. Generally, a high gear ratio allows for higher maximum speed, but lower maximum torque, while a low gear ratio allows for a higher maximum torque, but lower maximum speed. In tools with traditional mechanical clutches, the maximum torque allowable is typically limited to a maximum torque to be provided in the high gear ratio (high speed) mode. As a result, while the low gear ratio mode would allow for a higher maximum torque absent the mechanical clutch, the mechanical clutch limits the maximum torque allowable in the low gear ratio (low speed) mode to the maximum torque to be provided in the high gear ratio mode. As such, the higher torques of the low gear ratio mode remain unavailable in a clutching mode. In contrast, the tool 100 includes an e-clutch rather than a mechanical clutch. The configurability of the e-clutch control module 134 removes the torque limit imposed by the higher gear ratio to be able to take advantage of the extra torque levels available by the low gear ratio.

Accordingly, in some embodiments, the e-clutch control module 134 allows a user to specify a higher torque level for the low speed mode than is selectable for the high speed mode. For instance, in FIGS. 6A-B, the low speed mode is selected and the maximum torque allowed is approximately 175 in-lbs., which is the same maximum torque allowed in the high speed mode. However, in some embodiments, the tool 100 can achieve a higher torque output while in the low speed mode. Accordingly, in some embodiments, the maximum selectable torque level is a first value (e.g., 175 in-lbs.) when in the high speed mode; but, in the low speed mode, the maximum selectable torque level is a greater value (e.g., 300 in-lbs. or 1000 in-lbs.).

In some embodiments, the e-clutch control module 134 allows a user to individually provide a torque level for each setting of the clutch collar 108. A GUI of the remote device 140 may include a text box, slider, or other input mechanism, for each setting of the clutch collar 108 to enable a user to enter a custom torque level for each clutch collar setting. For example, the user may enter 200 in-lbs for setting 1, 150 in-lbs for setting 2, and 700 in-lbs for setting 3. In other embodiments, the GUI of the remote device 140 may receive, from a user, custom values for a subset of the settings, and a range for the other settings. For instance, for a clutch collar 108 having thirteen settings (e.g. 1-13), the GUI may receive custom torque levels for settings the three settings (e.g., 1-3), and a range for the remaining settings (e.g., 4-13) defined by a maximum value and a minimum value. The remote device 140 may, in turn, divide the range among the remaining settings (e.g., 4-13), similar to as described above with respect to Table I.

In some embodiments, the e-clutch control module 134 receives via a GUI of the remote device 140 different ranges for different subsets of the settings of the clutch collar 108. For example, the GUI may provide a mapping of torque levels to the e-clutch control module 134, based on received user input, specifying a first range of torques for a first group of settings (e.g., 1-5) of the clutch collar and a second range of torques for a second group of settings (e.g., 6-13) of the clutch collar, the ranges each defined by maximum and minimum torque levels similar to as described above.

Figure 7:
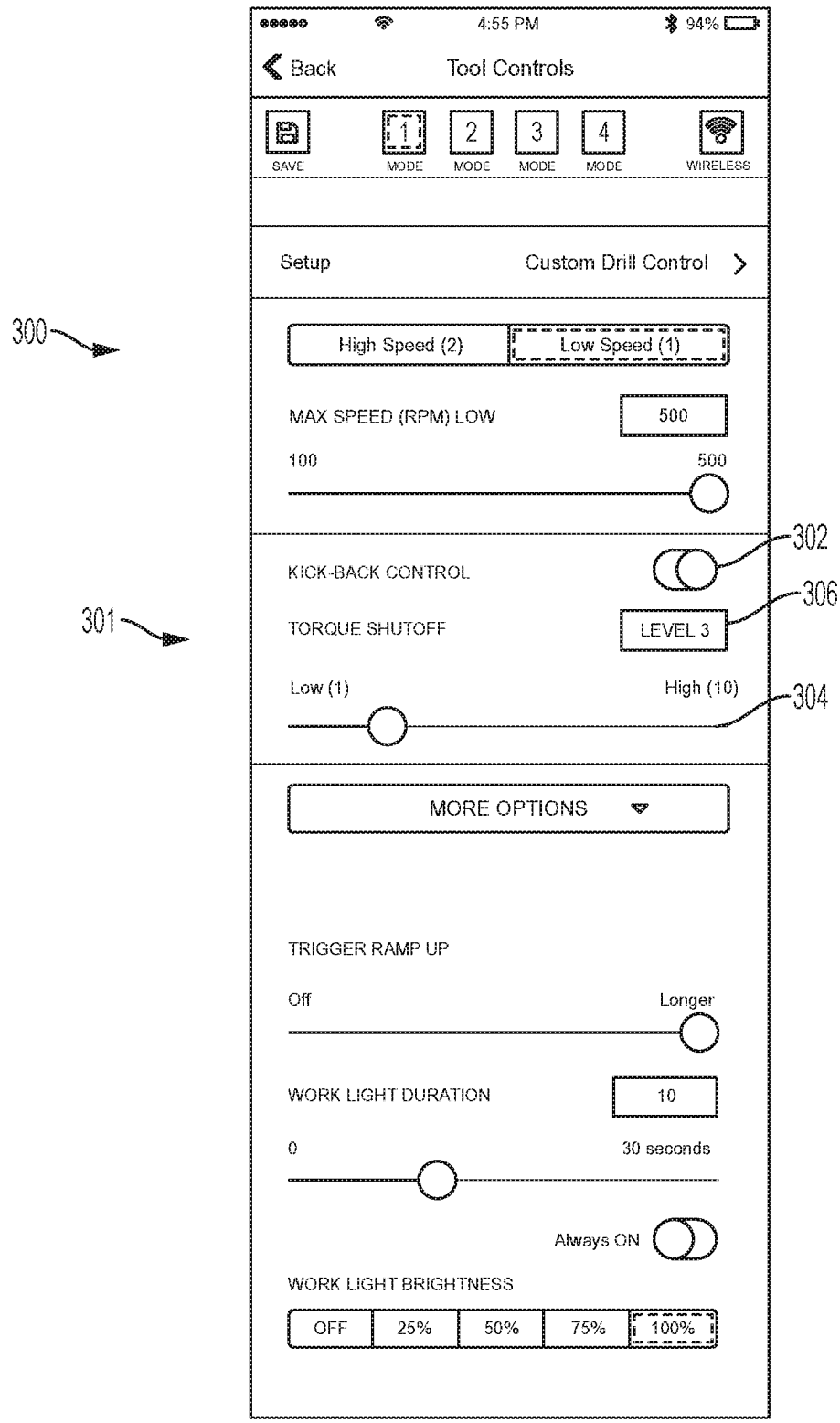
FIG. 7 illustrates a graphical user interface of a remote device associated with the power tool of FIGS. 1A and 1B according to some embodiments.

FIG. 7 illustrates another graphical user interface, GIU 300, generated by the remote device 140 and used to configure the tool 100. The GUI 300 is configured to receive user input specifying a custom drill control profile, which is then transmitted by the remote device 140 to the power tool 100 to configure operation of the power tool 100. The GUI 300 is similar to the GUI 250 of FIGS. 6A-B, but includes different features, including an anti-kickback feature block 301. More particularly, the GUI 300 includes an anti-kickback toggle 302 that has an enable and a disable position, selectable by the user. For instance, as illustrated in FIG. 7, the anti-kickback toggle 302 is in the enabled position, but is switched to the disabled position by swiping to the left on the GUI 300 (e.g., on a touch screen of the remote device 140). When enabled, the user is operable to set the sensitivity of the anti-kickback feature by setting a torque shutoff level (i.e., an anti-kickback torque level). In the illustrated example, the user may adjust the torque shutoff level between level 1 and level 10 by sliding the slider 304. The GUI 300 also includes a torque shutoff level indicator 306 indicating the currently selected torque shutoff setting, which is set to level 3 in FIG. 7. After the remote device 140 receives the user settings of the custom drill profile via GUI 300, the remote device 140 transmits the profile (configuration data) to the power tool 100 wirelessly or via a wired connection, which is received by the motor control unit 130. As previously described, the mode selector pushbutton 113 may be pressed to cycle through profiles of the tool 100 and to select the custom drill control profile having the anti-kickback feature enabled.

In operation, while the power tool 100 is performing a drilling operation with the anti-kickback feature is enabled, the e-clutch control module 134 monitors the battery current to the motor 126 using the current sensor 135, as described above. The e-clutch control module 134 also determines a current threshold based on the selected torque shutoff setting (e.g., using a look up table mapping each torque shutoff setting to a current value). When the e-clutch control module 134 determines that the battery current level reaches the current threshold, the motor control unit 130 ceases driving the motor 126 to bring the motor 126 to a quick stop. Thus, the motor control unit 130 infers that a kickback situation is occurring based on an increase in motor torque, which is inferred via battery current, and shuts down the motor 126.

When the anti-kickback toggle 302 is disabled, and the remote device 140 communicates the custom drill profile configuration data to the power tool with the disabled feature status, the power tool 100 proceeds without a torque shutoff as described.

As illustrated in FIG. 7, other tool operation parameters may be specified via the GUI 300. For example, the GUI 300 is operable to receive a maximum speed for the motor 126 (for both the high and low speed setting), a trigger ramp up parameter indicating a pace at which the motor 126 should ramp up to a desired speed, a work light duration indicating how long to keep the light 116 enabled (e.g., after the trigger 112 is pressed or released), and a work light brightness level.

The GUI 300, in turn, generates a custom drill control profile including the specified parameters, which is transmitted to the motor control unit 130. The profile may be stored in a memory of the motor control unit 130. The motor control unit 130, in turn, controls the power tool 100 in accordance with the parameters specified by the custom drill control profile.

Figure 8:
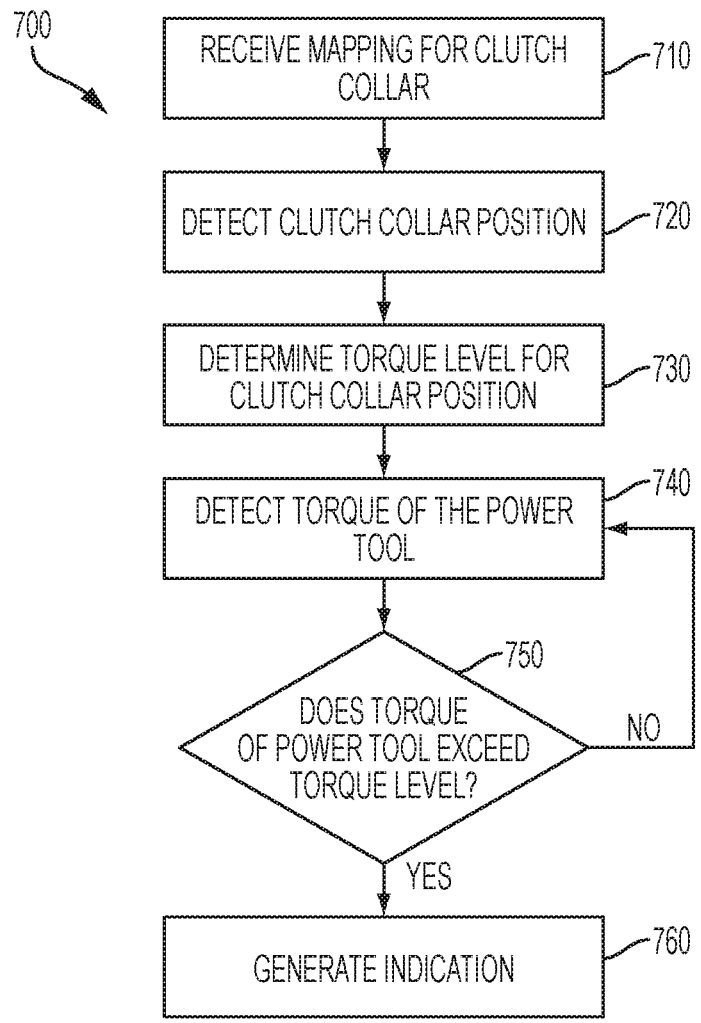
FIG. 8 illustrates a flowchart of a method of operating a power tool having an electronic clutch according to some embodiments.

FIG. 8 illustrates a flowchart of a method 700 of operating a power tool 100 having an electronic clutch. The method 700 includes receiving a mapping for the clutch collar 108 (at step 710). For example, the mapping may be part of a profile generated by the remote device 140 in response to user inputs received by the GUI 250 (FIGS. 6A and 6B). The profile may also include an indication of a mode specified via the GUI 250, such as an adjustable mode or a fixed mode. The mapping indicates or assigns a torque level for each of the plurality of positions (that is, plurality of settings) of the clutch collar 108. The motor control unit 130 receives and stores the mapping from the remote device 140 via the wireless transceiver 137. A processor of the motor control unit 130 may store the mapping in a memory of the motor control unit 130.

In some embodiments, as described above, the mapping includes torque levels for two or more revolutions of the clutch collar 108. For example, the mapping may include torque levels corresponding to a plurality of settings for a first revolution of the clutch collar and a second plurality of torque levels corresponding to the plurality of settings for a second revolution of the clutch collar. Assuming that the clutch collar 108 includes thirteen settings for one revolution of the clutch collar 108, this mapping may include twenty-six torque levels, one for each setting (or, position) of the clutch collar 108 over two revolutions. In some embodiments, torque levels for more than two revolutions of settings of the clutch collar are provided. In some embodiments, the mapping specifies a maximum torque level, and minimum torque level, and an increment/decrement level indicating the change in target torque levels between settings of the clutch collar 108.

At step 720, the motor control unit 130 detects the clutch collar 108 position selected by the user of the power tool 100. As described above with respect to FIGS. 3A, 3B, and 4, the user may rotate the clutch collar 108 to select a particular torque level. At step 730, the motor control unit 130 determines the torque level for the position of clutch collar 108 selected by the user. The motor control unit 130 determines this torque level based on the mapping received at step 710. As described above, in some embodiments, the remote device 140 may transmit a profile to the power tool 100 including a user-specified fixed torque level. In these embodiments, the motor control unit determines the torque level to be the fixed torque level received from the remote device 140, which may occur by the motor control unit 130 ignoring the position of the clutch collar 108, ignoring the speed setting, or assigning the fixed torque level to each of the positions of the clutch collar 108 such that the fixed torque level is selected regardless of the position of the clutch collar 108.

At step 740, the motor control unit 130 detects a torque of the power tool 100. The motor control unit 130 detects the torque, for example, based on motor current. For example, the current sensor 135 senses the current flowing to the motor 126 and provides a signal indicative of the current to the motor control unit 130. The motor control unit 130 may use techniques described above to determine the torque based on the signal received from the current sensor 135.

At step 750, the motor control unit 130 determines whether the toque of the power tool 100 exceeds the torque level determined at step 730. In some embodiments, this determination may involve a comparison of torque levels (e.g., in inch-pounds or Newton-meters), and, in other embodiments, the determination may involve a comparison of current values indicative of a torque (e.g., in Amperes). When the torque detected in step 740 exceeds the torque level determined at step 730, the motor control unit 130 generates an indication (at step 760). The indication includes, for example, flashing the light 116, ratcheting the motor 126, and/or stopping the motor 126. In other words, in response to determining that the detected torque of the power tool exceeds the torque level, the motor control unit 130 may stop the motor 126 to provide the indication, for instance, by ceasing the sending of driving signals to the FETs 124 or by controlling the FETs 124 to actively brake the motor 124. In some embodiments, the motor control unit 130 may ratchet the motor 126 to provide the indication in step 750. In some embodiments, the motor control unit 130 may control the light 116 to flash to provide the indication. In yet further embodiments, the motor control unit 130 generates the indication by using a combination of flashing the light 116, ratcheting the motor 126, and stopping the motor 126. For example, the control unit 130 may flash the light 116 and ratchet the motor 126 for a first period of time, and then stop the motor 126. The method 700 repeats steps 740 and 750 until the torque exceeds the torque level determined in step 730, until a new position of the clutch collar 108 is selected, or until the trigger 112 is released.

In some embodiments, the mapping received in step 710 includes a first mapping for a high speed setting and a second mapping for a low speed setting. When the power tool 100 is in the high speed setting, indicated by the speed select switch 111, the first mapping is used by the e-clutch control module 134 (e.g., in step 730 for determining the torque level). However, when the power tool is in the low speed setting, indicated by the speed select switch 111, the second mapping is used by the e-clutch control module 134. Accordingly, the clutch collar 108 may indicate different desired torque levels at same rotational position depending on the position for the speed select switch 111. In some embodiments, the maximum torque level of the first mapping is less than the maximum torque level of the second mapping.

In some embodiments, the method includes receiving, from a speed select switch, a speed setting. The method further includes compensating for the speed setting in detecting the torque of the power tool in step 740 or in calculating the torque level in step 730 to provide similar performance regardless of the speed setting. For example, through the compensation, the torque of the power tool upon generating the indication in step 750 for a particular setting of the clutch collar 108 is approximately the same regardless of the speed setting.

In some embodiments, the method 700 includes a further step of receiving, via the wireless transceiver, a request to enter a fixed torque mode and a fixed torque level. The request and the fixed torque level may be provided by the remote device 140 as part of a control profile generated based on user input on the GUI 250. In a subsequent operation of the power tool, the e-clutch control module 134 detects, during a subsequent operation of the power tool, that a subsequent torque of the power tool exceeds the fixed torque level. The subsequent torque of the power tool is detected similar to the torque detection of step 740. The motor control unit 130 then generates a second indication that the subsequent torque exceeds the fixed torque level. The second indication is generated similar to the indication of step 760, and may include one or more of stopping the motor 126, ratcheting the motor 126, and flashing the light 116.

In some embodiments, the mapping received in step 710 includes a first torque value generated by the remote device 140 based on user input, for example, received via the GUI 250. The motor control unit 130 uses the first torque value and calculates, in advance or as needed, torque levels for the plurality of settings. For example, in step 730, the motor control unit 130 calculates a torque level for the clutch collar setting detected in step 720 based on the position of the clutch collar setting among the plurality of settings and the first torque value. The first torque value may indicate a maximum torque level or a minimum torque level. Taking, for example, the first torque value as indicative of a minimum torque level, the motor control unit 130 may calculate the torque level of the setting by assuming a particular torque increment and incrementing the minimum torque level by the number of settings that the clutch collar setting is above the minimum clutch collar setting. Alternatively, the motor control unit 130 may use a default maximum torque level in combination with the received minimum torque level and calculate the torque level for the clutch collar setting to be a value proportional or corresponding to the position of the clutch setting among the plurality of settings. For example, a clutch collar setting of six out of thirteen possible settings would result in a torque level that is greater than the mid-point between the minimum and maximum torque levels, assuming a linear scale, and a clutch collar setting of five out of thirteen settings would result in a torque level that is below the mid-point. The motor control unit proceeds to control the motor based on the calculated torque level. For example, the motor control unit 130 proceeds to execute steps 740, 750, and 760, in some embodiments, and uses the calculated torque level in the determination of step 750.

In some embodiments, in step 710, a first torque value and a second torque value are received, and calculating the torque level is further based on the second torque value. In some examples, the first torque value is indicative of a minimum torque level and the second torque value is indicative of a maximum torque level. Similar to as described immediately above, the motor control unit 130 uses the first torque value and the second torque value to calculate, in advance or as needed, torque levels for the plurality of settings. In some examples, the first torque value is indicative of a first torque level for a first setting, the second torque value is indicative of a second torque level for a second setting, the method further includes associating remaining settings of the plurality of settings with torque levels between the first torque level and the second torque level.

Although the flow chart of FIG. 8 is illustrated and described as steps performed in a serial manner, one or more blocks of the method 700 may be executed in parallel or in a different order than described. Further, the processor of the motor control unit 130 may execute instructions to implement the steps and functions of the method 700 attributable to the motor control unit 130.

Although the tool 100 is described as a hammer drill, in some embodiments, the tool 100 is a standard, non-hammering drill/driver, or another drill/driving tool, such as an angle driver or an impact driver.

Thus, the invention provides, among other things, a power tool having a configurable electronic clutch and methods of configuring an electronic clutch. Various features and advantages of the invention are set forth in the following claims.

What is claimed is:

1. A power tool comprising:
    a housing;
    a motor within the housing;
    a clutch collar on the housing including a plurality of settings;
    a wireless transceiver operable to form a wireless connection with a remote device; and
    a processor coupled to the clutch collar and the wireless transceiver, the processor configured to:
        receive, via the wireless transceiver, a mapping including a plurality of torque levels corresponding to the plurality of settings,
        detect that the clutch collar is set to a setting of the plurality of settings,
        determine the torque level for the setting from the mapping,
        detect, during operation of the power tool, that a torque of the power tool exceeds the torque level, and
        generate an indication that the torque exceeds the torque level.

2. The power tool of claim 1, further comprising a current sensor coupled to the processor, wherein the processor is configured to detect the torque based on a motor current sensed by the current sensor.

3. The power tool of claim 1, wherein the indication includes at least one selected from the group consisting of flashing a light, ratcheting the motor, and stopping the motor.

4. The power tool of claim 1, wherein the indication includes ratcheting the motor, and an intensity of the ratcheting is set by the processor based on the torque level.

5. The power tool of claim 1, wherein the mapping includes the plurality of torque levels corresponding to the plurality of settings for a first revolution of the clutch collar and a second plurality of torque levels corresponding to the plurality of settings for a second revolution of the clutch collar.

6. The power tool of claim 1, further comprising a speed select switch having a high-speed setting and a low-speed setting, the speed select switch coupled to the processor, wherein the processor is further configured to receive the mapping for the high-speed setting and receive a second mapping for the low-speed setting.

7. The power tool of claim 6, wherein a maximum torque level of the mapping for the high-speed setting is less than a maximum torque level of the second mapping for the low-speed setting.

8. The power tool of claim 1, further comprising a speed select switch having a speed setting, the speed select switch coupled to the processor, wherein the processor compensates for the speed setting in detecting the torque of the power tool such that, for the setting of the plurality of settings of the clutch collar, the torque of the power tool upon generating the indication is approximately the same regardless of the speed setting.

9. The power tool of claim 1, wherein the processor is further configured to:
    receive, via the wireless transceiver, a request to enter a fixed torque mode and a fixed torque level;
    detect, during a subsequent operation of the power tool, that a subsequent torque of the power tool exceeds the fixed torque level; and
    generate a second indication that the subsequent torque exceeds the fixed torque level.

10. The power tool of claim 1, wherein the processor is further configured to:
  receive, via the wireless transceiver, a request to enable an anti-kickback feature;
  set an anti-kickback torque level;
  detect, during operation of the power tool, that the torque of the power tool exceeds the anti-kickback torque level; and
  stop the motor when the torque exceeds the anti-kickback torque level.

11. A method of operating a power tool including a housing, a motor within the housing, a clutch collar on the housing including a plurality of settings, and an electronic clutch, the method comprising:
  receiving, with a processor via a wireless transceiver, a mapping including a plurality of torque levels corresponding to the plurality of settings;
  detecting, with the processor, that the clutch collar is set to a setting from the plurality of settings;
  determining, with the processor, the torque level for the setting from the mapping;
  detecting, with the processor, that a torque of the power tool exceeds the torque level during operation of the power tool; and
  generating, with the processor, an indication that the torque exceeds the torque level.

12. The method of claim 11, wherein detecting the torque includes detecting a motor current and calculating an estimated torque based on the motor current.

13. The method of claim 11, wherein the indication includes ratcheting the motor, and an intensity of the ratcheting varies with the torque level.

14. The method of claim 11, wherein the mapping includes the plurality of torque levels corresponding to the plurality of settings for a first revolution of the clutch collar and a second plurality of torque levels corresponding to the plurality of settings for a second revolution of the clutch collar.

15. The method of claim 11, further comprising:
  receiving, from a speed select switch, a selection of at least one selected from the group consisting of a high-speed setting and a low-speed setting, wherein the mapping corresponds to the high-speed setting; and
  receiving, with the processor, a second mapping for the low-speed setting.

16. The method of claim 15, wherein a maximum torque level of the mapping for the high-speed setting is less than a maximum torque level of the second mapping for the low-speed setting.

17. The method of claim 11, receiving, from a speed select switch, a speed setting;
  compensating for the speed setting in detecting the torque of the power tool such that, for the setting of the plurality of settings of the clutch collar, the torque of the power tool upon generating the indication is approximately the same regardless of the speed setting.

18. The method of claim 11, further comprising:
  receiving, via the wireless transceiver, a request to enter a fixed torque mode and a fixed torque level;
  detecting, during a subsequent operation of the power tool, that a subsequent torque of the power tool exceeds the fixed torque level; and
  generating a second indication that the subsequent torque exceeds the fixed torque level.

19. The method of claim 11, further comprising:
  receiving, via the wireless transceiver, a request to enable an anti-kickback feature;
  setting, with the processor, an anti-kickback torque level;
  detecting, with the processor during operation of the power tool, that the torque of the power tool exceeds the anti-kickback torque level; and
  stopping, with the processor, the motor when the torque exceeds the anti-kickback torque level.

20. The method of claim 11, wherein generating the indication includes at least one selected from the group consisting of flashing a light, ratcheting the motor, and stopping the motor.

21. A method of operating a power tool including a housing, a motor within the housing, a clutch collar on the housing including a plurality of settings, and an electronic clutch, the method comprising:
  receiving, with a processor via a wireless transceiver, a first torque value generated by a remote device based on user input and wirelessly transmitted by the remote device to the wireless transceiver;
  detecting, with the processor, that the clutch collar is set to a setting of the plurality of settings;
  calculating, with the processor, a torque level for the setting based on the position of the setting among the plurality of settings and the first torque value; and
  controlling the motor based on the torque level.

22. The method of claim 21, wherein controlling the motor based on the torque level include:
  detecting, with the processor, that a torque of the power tool exceeds the torque level during operation of the power tool; and
  controlling the motor to one or more of stop and ratchet.

23. The method of claim 21, further comprising:
  receiving, with the processor via the wireless transceiver, a second torque value generated by the remote device based on the user input, and
  wherein calculating the torque level is further based on the second torque value.

24. The method of claim 23, wherein the first torque value is indicative of a first torque level for a first setting, the second torque value is indicative of a second torque level for a second setting, the method further comprising:
  associating remaining settings of the plurality of settings with torque levels between the first torque level and the second torque level.

25. The method of claim 21, further comprising:
  providing, by the external device, a graphical user interface;
  receiving, by the external device, an indication of the first torque value and a second torque value via the graphical user interface, wherein the first torque value is indicative of a minimum torque level and the second torque value is indicative of a maximum torque level.

26. The power tool of claim 1, wherein the mapping correlates each of the plurality of torque levels with a respective one of the plurality of settings of the clutch collar, and to determine the torque level for the setting from the mapping, the electronic processor is configured to select the torque level that is correlated to the setting by the mapping.

27. The power tool of claim 1, wherein the electronic processor is further configured to:
  receive, via the wireless transceiver, a second mapping including a second plurality of torque levels corresponding to the plurality of settings of the clutch collar to provide an updated correlation of the plurality of settings of the clutch collar to the second plurality of torque levels;

detect, after receiving the second mapping, that the clutch collar is again set to the setting of the plurality of settings,
determine an updated torque level for the setting from the second mapping,
detect, during further operation of the power tool, that the torque of the power tool exceeds the updated torque level, and
generate a second indication that the torque exceeds the updated torque level.

\* \* \* \* \*